(12) United States Patent
Brewington

(10) Patent No.: US 6,259,165 B1
(45) Date of Patent: Jul. 10, 2001

(54) POWER GENERATING DEVICE AND METHOD

(75) Inventor: Doyle W. Brewington, Northampton Spring, TX (US)

(73) Assignee: Power Tube, Inc., Houston, TX (US)

( * ) Notice: Subject to any disclaimer, the term of this patent is extended or adjusted under 35 U.S.C. 154(b) by 0 days.

(21) Appl. No.: 09/553,761

(22) Filed: Apr. 21, 2000

Related U.S. Application Data
(60) Provisional application No. 60/130,637, filed on Apr. 23, 1999.

(51) Int. Cl.$^7$ .................................................. H02P 9/04
(52) U.S. Cl. ................................ 290/1 A; 290/2; 60/641.2
(58) Field of Search ........................ 290/1 A, 2; 60/641.1, 60/641.2, 648, 651, 671, 670, 656, 39.142

(56) References Cited

U.S. PATENT DOCUMENTS

| | | | |
|---|---|---|---|
| 3,755,076 | * 8/1973 | Lindsley | 376/273 |
| 3,827,243 | * 8/1974 | Paull et al. | 60/641.2 |
| 3,938,334 | 2/1976 | Matthews | 60/641.4 |
| 3,938,335 | * 2/1976 | Marwick | 60/673 |
| 3,986,362 | * 10/1976 | Baciu | 60/641.2 |
| 3,988,896 | 11/1976 | Matthews | 60/641.4 |
| 4,023,136 | * 5/1977 | Lamensdorf et al. | 340/854.3 |
| 4,100,744 | * 7/1978 | Munari | 60/651 |
| 4,107,987 | 8/1978 | Robbins et al. | 73/152.61 |
| 4,291,232 | * 9/1981 | Cardone et al. | 290/1 R |
| 4,380,903 | 4/1983 | Matthews | 60/641.4 |
| 4,386,499 | * 6/1983 | Raviv et al. | 60/657 |
| 4,407,126 | * 10/1983 | Aplenc | 60/641.4 |
| 4,899,534 | * 2/1990 | Sorenson | 60/39.06 |
| 5,058,386 | * 10/1991 | Senanayake | 60/692 |
| 5,099,648 | * 3/1992 | Angle | 60/726 |
| 5,513,573 | * 5/1996 | Sutton | 104/138.1 |

FOREIGN PATENT DOCUMENTS

| | | |
|---|---|---|
| 498700 | 5/1930 | (DE) . |
| 2918001A1 | * 11/1980 | (DE) . |
| 2520448 | * 7/1983 | (FR) . |

* cited by examiner

Primary Examiner—Joseph Waks
(74) Attorney, Agent, or Firm—Antonelli, Terry, Stout & Kraus, LLP

(57) ABSTRACT

A system and method are provided for supplying electric power by harnessing thermal energy below the Earth's surface. A boiler module, a turbine module, a condenser module and a generator module may all be provided. Each of the boiler module, the turbine module, the condenser module and the generator module are placed below the Earth's surface to produce electric power.

22 Claims, 18 Drawing Sheets

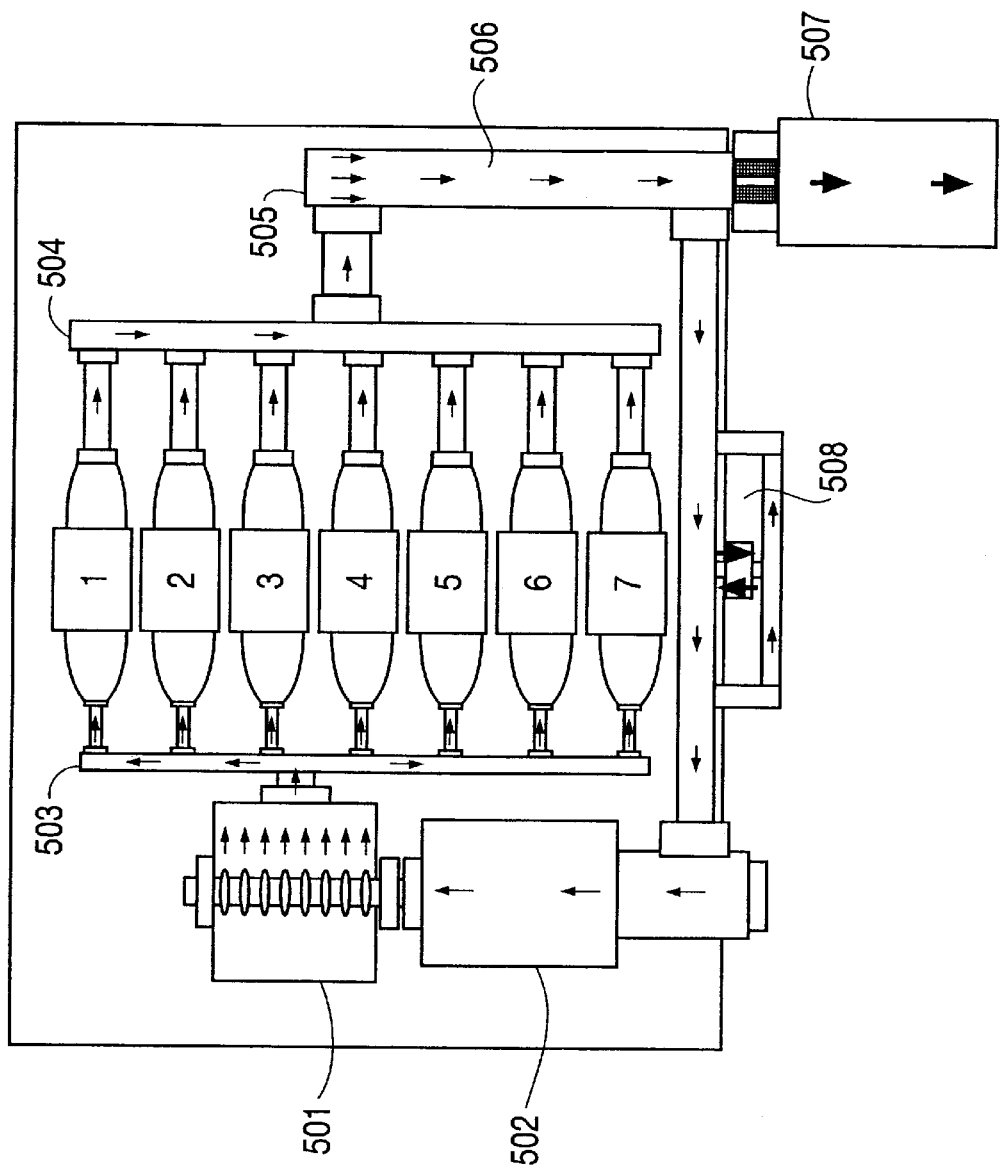

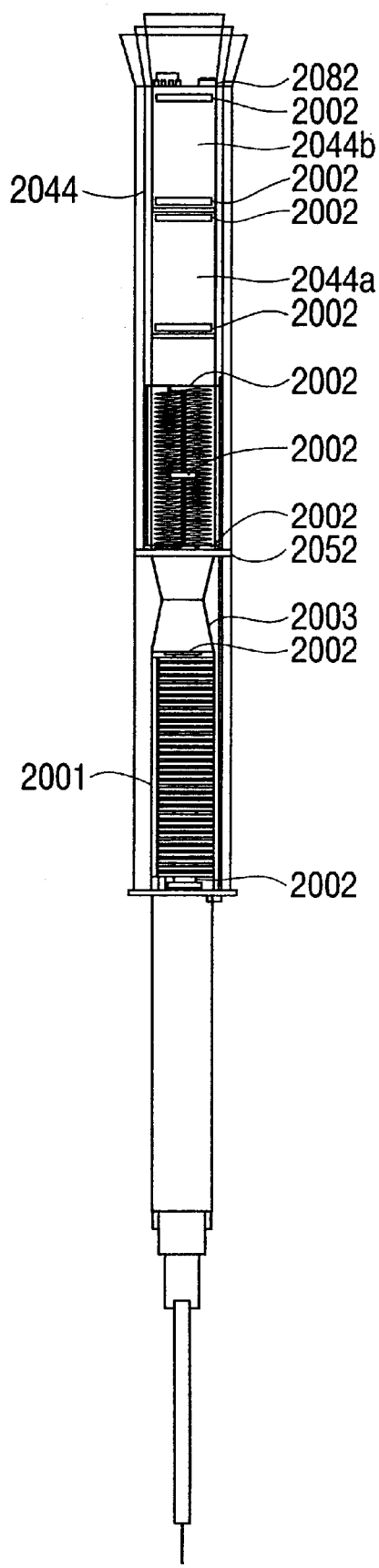

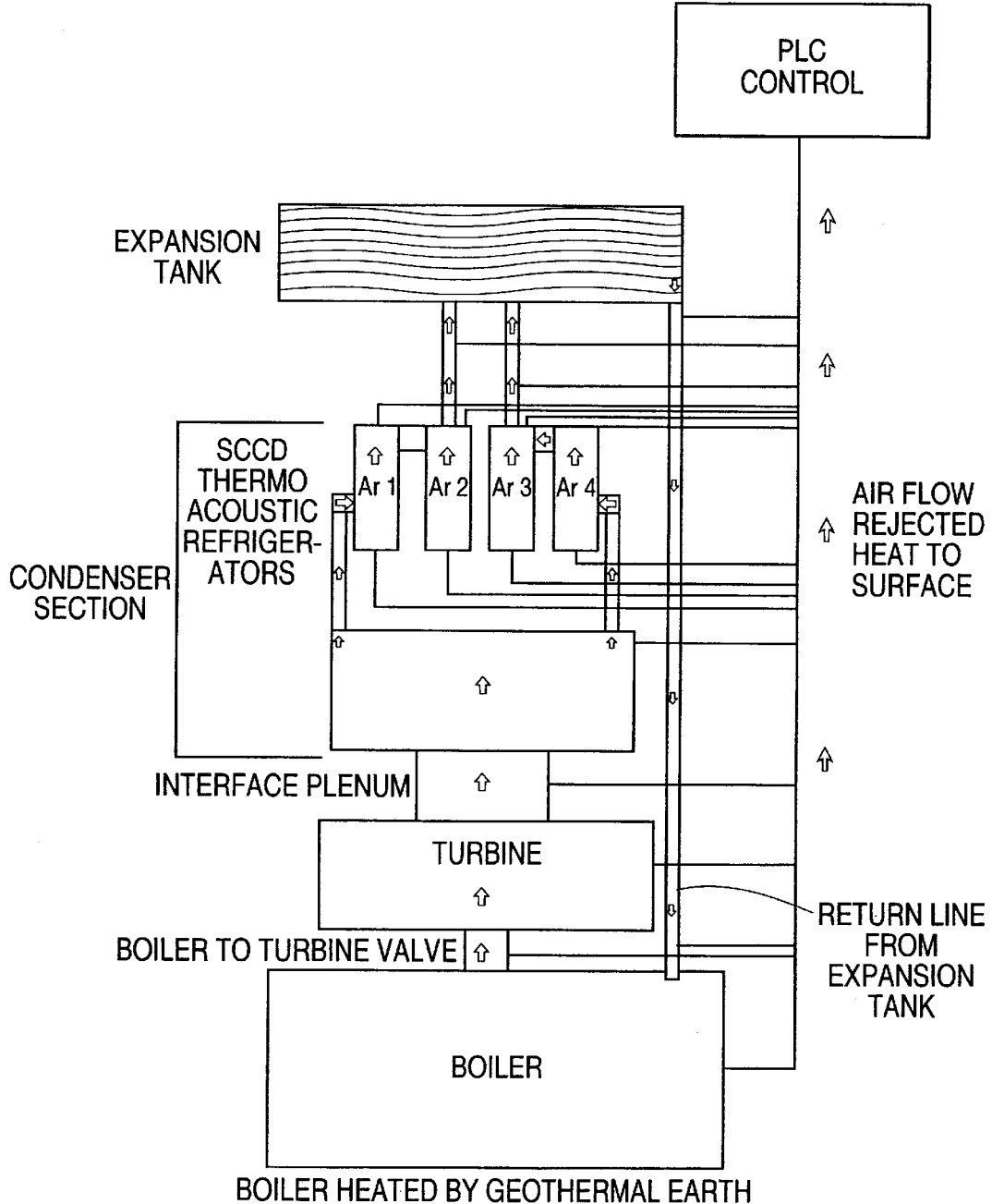

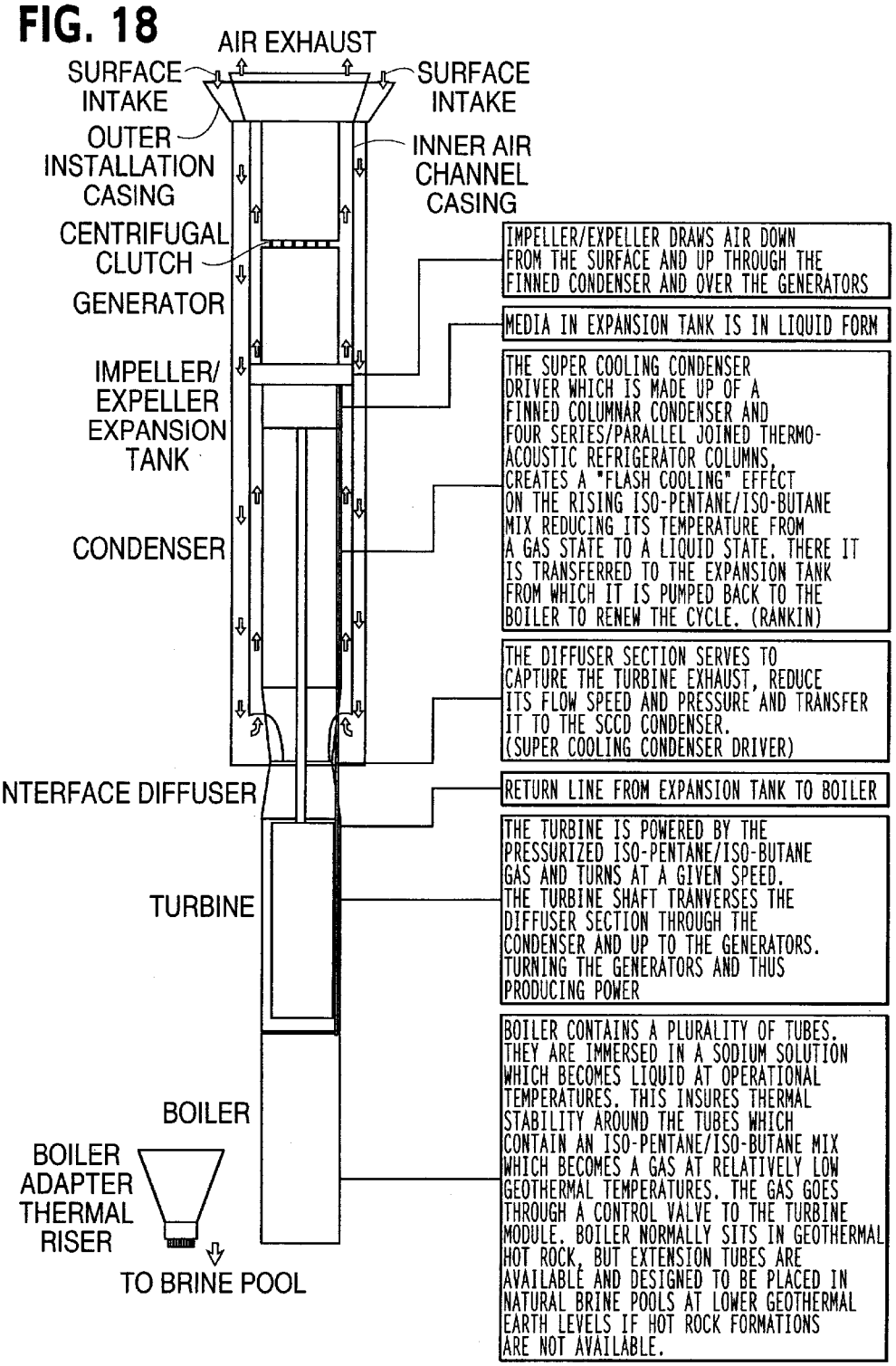

POWER GENERATING DEVICE AND METHOD

This application claims the benefit under 35 USC §119 of U.S. Provisional application No. 60/130,637, filed on Apr. 23, 1999, the subject matter of which is incorporated herein by reference.

FIELD OF THE INVENTION

The present invention is directed to electric power generation, and in particular, electric power generation utilizing geothermal heat sources.

BACKGROUND OF RELATED ART

There are many known methods of using the heat of the earth, i.e., geothermal power, to produce electricity. Most methods, however, require expensive maintenance and are limited in that they produce environmental pollution, degrade the geothermal source and/or geographical location of the geothermal resource. Among the restraints that create the high costs of maintenance are the conditions of the geothermal resource, which often contains hydrochloric acid, sulphuric acid and/or nitric acid, all in the form of vapors or fumes that eat away at the materials used to harness the energy. A geothermal unit desired to last for an extended period of time typically includes a closed loop system, that is, a system that processes its internal media, usually water, from a gaseous state (steam) back to a liquid state in a continuing cycle. However, such a closed loop system has the problem of molecular mass growth of mineral or metallic matter that increases in volume over time. Although the water used in a closed system starts out inert, the carbon dioxide, and all minerals being removed, the continuing action of "molecular drag" of the water being forced through the system in its two basic states, water and steam, and enduring the many cycles of that transformation over time foments the environment under which this "molecular drag" takes place. When the molecular mass grows sufficiently, it becomes damaging to the working parts of the system and can be fatal to the turbine if it strikes the turbine blades at high pressure or high speed. It may also lock up the valves, gates and pumps of the power system.

Many methods use additional water that is pumped down into the geothermal source which is then heated by the geothermal source and either pumped back to the thermal jackets of the turbine boilers or returned of its own accord under pressure of contact with the geothermal source.

Conventional installations are costly and ponderous in size. Geothermal units also create environmental pollution by emitting gases that are brought to the surface, or by producing contaminated water that has been pumped from the geothermal source. The contaminated water is sometimes eliminated by forming surface ponds that contaminate the soil, or by diverting the runoff into ocean or waterways. In some systems, contaminated steam is dispersed into the atmosphere. Moreover, surface operations are highly noise polluting.

During the generation of electricity by coal or gas burning units, gas may be emitted and create "acid rain". This "acid rain" drifts with the prevailing winds and causes devastation to forests, rivers and the landscape. Similarly, for the average power plant, the area that must be cleared is very large. Additionally, there is a great deal of waste in power plants, such as steam turbines powered by gas, oil, or coal as most in use today require water streams of 500 or more gallons per minute to function, especially that use heat recovery generating systems (HRGSs). That water is usually dumped after use, typically downstream into a river or tributary at a temperature harmful to the ecosystem.

Waste is also generated by the continual usage of parts that must constantly be changed. These parts usually are discarded as they generally are not repairable. This creates yet another source of pollution. Of course, all fossil-fuel plants consume an irreplaceable resource, namely fossil fuel.

One of the more costly segments of conventional power installations is the manpower required to construct and operate the same. In particular, the electrical cable installations within the units are often subject to relatively high temperatures. Such environments lead to required changes of the wiring harness from time to time so as to keep the insulation from getting charred or brittle over time.

Additionally, because there is no harmonic synchronization between boiler and condensers, most power plants do not re-condense the steam to water, but rather discharge the steam. Those power plants that do recondense the steam to water have a myriad of pumps and valves that require a great amount of power for operation. The required power is often taken from what is generated thus lessening the amount of power available to be sold.

It can therefore be appreciated why most power systems are still not efficient and are still a pollution problem.

If power is to be made more affordable then it should also be made as safe as possible, non-polluting, immediately renewable, and reasonably limited in the amount of space and materials consumed. Moreover, it should be dependable for long periods of time and simple to supervise, manage and control.

SUMMARY OF THE INVENTION

The present invention may provide a system for the supply of electrical energy by harnessing the geothermal temperatures that can be found in various depths in the Earth's crust.

The present invention, also referred to herein as "power tube," is preferably designed as a self monitoring, low maintenance device, providing uninterrupted service for a minimum five years. The unit preferably is silent, non-polluting and may be replaced in approximately six and one half hours with another one of equal power when its service cycle is reached. The system is preferably modular combining four separate sections all of which preferably are controlled by an electronic processor/computer that maintains the flow of internal fluids through the phase changes of liquid-to-steam-to-liquid. With such phase changes and in conjunction with the "harmonic matching", the energy necessary to keep a turbine in motion may be provided. The turbine may be preferably fastened to a generator that ultimately produces electricity.

The system preferably includes four modules that are linked in interlocking order. The modules can be interchanged with other modules of higher or lesser capacity depending on the application and thermal resource available. Several joined modules may be used to increase the output of a total system. The main four modules may include: (1) the matched harmonic boiler, (2) the matched harmonic condenser, (3) the single speed tuned turbine, and (4) the brushless generator. Other support systems may include a matched harmonic expansion tank and flash cooling system that serve to accelerate the condensing of steam back into liquid and the cooling of a lubricating system that runs through the power tube structure interlocking to form a closed lubricating circuit when the modules are fastened together.

Still, a further object of the present invention may be to include an acoustic compression sound wave system to provide the down hole refrigeration and flash cooling in the condensing area and oil cooling reservoir. This may lessen the use of power systems developed power in the case of the 10 Mw, thereby reducing the need for a 60 Hp compressor= 45 Kw (typical for prior art systems) for refrigeration purposes down to 5 Hp=3.5 Kw which is a savings difference of 41.5 Kw.

Yet another object of the present invention may be to harness data generated by the various sensors and indicators and transfer said data to a remote control center where the internal operations of each system as installed can be monitored. This may provide a real time analysis of every unit installed world wide. The data from each unit may be up-linked to an orbiting space satellite service facility and relayed to the central control center.

Still another object of the present invention may be to provide world wide seismic data flow to subscribers from the power tube installations around the world that may emanate from a six axis seismic sensor within power tubes. The sensor may work on an independent power supply so that after seismic activity reaches a level that triggers a complete protective shut down for the power tube, the seismic signals continue to provide seismic data through the uplink satellite network.

Still another object of the present invention may be to provide the use of special thermal imaging satellites to locate areas around the globe that fit the criteria desired for geothermal installations of the present invention. These areas may be also referred to as target markets.

Other objects, aspects and salient advantages of the present invention will become apparent from the following detailed description of the preferred embodiment, taken in conjunction with the accompanying figures.

BRIEF DESCRIPTION OF DRAWINGS

The foregoing and better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The present invention will be described with reference to the following drawings in which like reference numeral denotes like features and wherein.

FIG. 15 shows a lubricating system that is provided in vapor mist form that may be used in accordance with the present invention;

FIG. 16 shows the application of electromagnetic bearings and common speed turbine/generator system in accordance with the present invention; and FIG. 17 is a diagram showing the media changing states; and FIG. 18 is a process diagram showing and energy cycle.

DETAILED DESCRIPTION OF PREFERRED EMBODIMENTS

Figure 1:
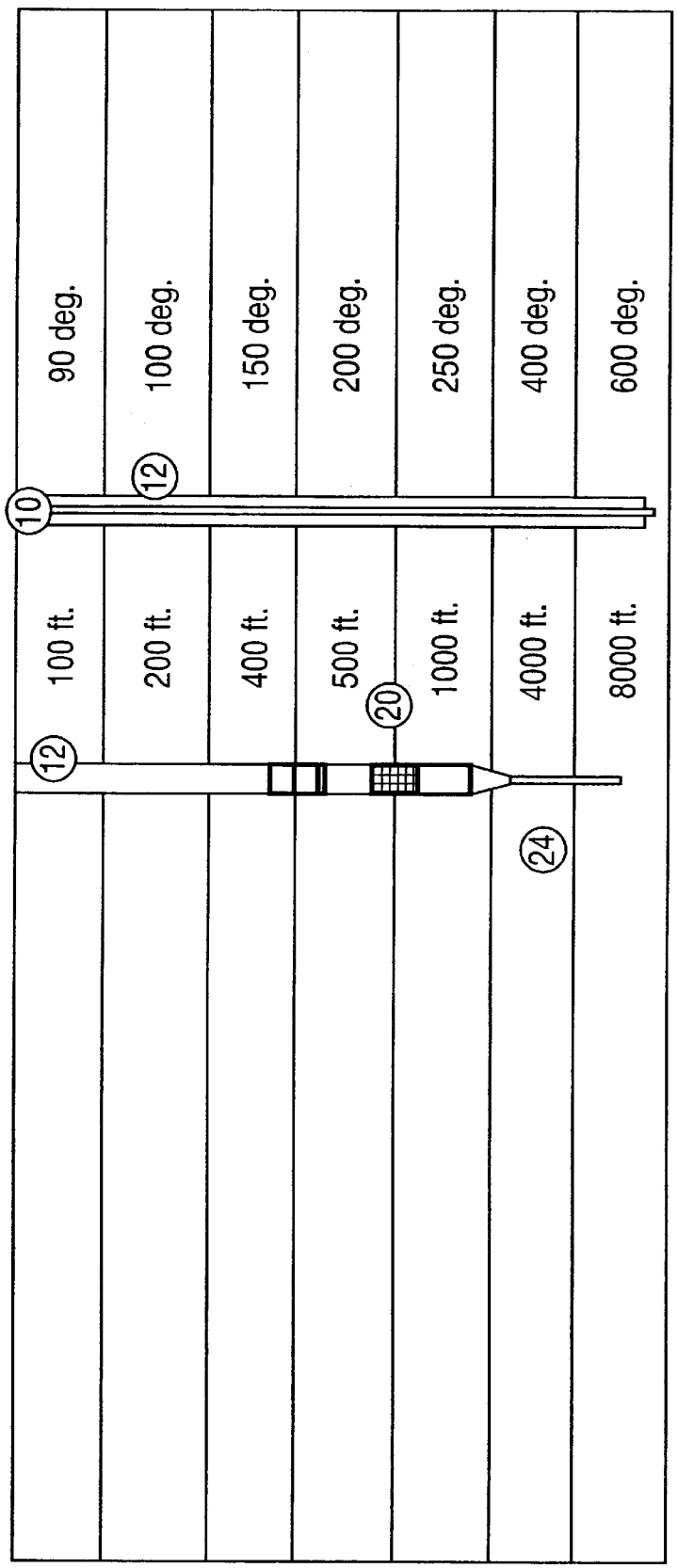
FIG. 1 shows the methods used in identifying and selecting the proper materials and installation depths as provided by the initial drill probe used with the Power Tube in accordance with the present invention.

The present invention may provide a system for the supply of electrical energy by harnessing and converting the geothermal energy that may be found at various depths below the Earth's crust. The present invention, also referred to herein as "Power Tube," is preferably designed to operate continually without interruption for at least five years. The unit preferably is silent, non-polluting and may be replaced in approximately six and one half hours with another of equal power when it has reached the end of it's primary service life. The system is preferably modular combining four separate sections all of which preferably are controlled by an electronic processor that maintains the flow of internal fluids through the phase changes of liquid-to-steam-to-liquid. With such phase changes and in conjunction with "harmonic matching", the energy necessary to keep a turbine in rotation may be provided. The turbine may be preferably coupled to a generator that ultimately produces electricity.

The system preferably comprises four modules that are linked in interlocking order. The modules can be interchanged with other modules of higher or lesser capacity, depending on the application and thermal resource available. Several joined modules may be used to increase the output of the total system. The main four modules may include: (1) the matched harmonic boiler, (2) the matched harmonic condenser,(3) the single speed tuned turbine, and (4) the brushless generator. Other support systems may include a matched harmonic expansion tank and a flash cooling system that serve to accelerate the cooling and balance of the steam back into liquid as well as the cooling of the lubricants in the system that run throughout the Power Tube structure and interlocks to form a closed lubricating circuit when the modules are fastened together.

The modules preferably are controlled by a systems processor and a systems computerized controller. The processor may receive the electronic information from a plurality of sensors as to the state and condition of each and send the information to the systems computerized controller that activates, deactivates or modifies the settings on a plurality of pumps, valves, gates and sensor settings. All of the signals may be transmitted over one buss bar in digital encoded and decoded messages that only the pumps, valves, gates and sensor setting controls that are addressed by their own access codes may respond to, even though the signals may all be transmitted simultaneously over the same buss bar. Such a configuration may eliminate over two and one half miles of wire and approximately 1,800 lbs of wire weight if conventional wire were being used. Moreover, the present invention may avoid the prior art problems of rapid deterioration of wiring insulation due to the constant high temperatures in geothermal down hole environments that would ordinarily preclude the unit from having a five year life cycle without servicing.

The Power Tube is preferably place in the ground at a depth predetermined by a test bore done at the site selected. The test bore may translate, by software, a picture of what the cavity may look like for any given individual application. A casing may be placed in the drilled down hole environment to protect the Power Tube. The casing preferably is designed with a seismic warning and lock down sensors. When the Power Tube is lowered into its operating position guided by what may be selected notched guide rails for each module in the casing and as each module reaches optimum positioning, a portion of the looped circuit of the lock down sensors is closed. As the circuit is completed, an internal power supply may be turned on. This internal power supply may also be kept charged by the same Power Tube Generator while in motion.

The seismic sensor is preferably a six axis device that may be a parallel/series circuit of its own within the lock down circuit. The sensor preferably activates when sensing 0.5 on the Richter Scale, and continues to operate for a time and as long as the tremor signal is above that trigger level. If the tremor reaches six on the Richter Scale, it shuts down the Power Tube in an attempt to avoid any internal damage thereto.

In a preferred embodiment there may be on the order of 125 signals that are generated within and emitted from the Power Tube. Each signal may be received by, for example, a portable computer systems, or any other data processing system that allows the unit to be efficiently monitored. These signals may be transmitted to a control center via a satellite network, thereby enabling thousands of Power Tube installations to be monitored and controlled from one center. Such a satellite implementation provides efficiency and status indication at the touch of a button. This further enables the proper supervision at the lowest cost and an indication in realtime of, for example, the total "megawatts" being generated and the total income stream being produced based on a certain amount of cents per kilowatt hour.

The present invention provides a system for the production of power through the assemblage of a unique modular system that is disposed in a geothermal active region of the Earth. The modular system may further include various devices and systems that enable the assemblage of functions as a stand alone unit. The assembled unit, or Power Tube, is disposed in the area identified and is monitored preferably from a central point. The foregoing may be accomplished without emitting polluting matter or sound, will not produce acid rain or create an eyesore to the environment unlike prior art systems.

As discussed above, the Power Tube may include a harmonized boiler/condenser system, a harmonized condenser/boiler system, an air start turbine unit, a brushless generator, a signal systems buss bar, various pumps, valves, controls sensors and attachments that may provide extended capabilities. The internal piping system may be of any appropriate design metal but may be coated with iron boride hardeners that may be implemented as an impediment to "molecular drag". The Power Tube may further include a "sound wave compressor" that eliminates the need for the additional space, weight and power consumption to maintain the refrigeration activity of the cooling section of the system. A power module may be located at the top of the Power Tube, followed by the condensing module, below which is the turbine module and finally at the base of the tube is the boiler module.

The Power Tube may be installed in a vertical configuration within a preselected Earth cavity that has been lined with a metal protective casing, preferably of a material as selected from the data base indicated by the resulting analysis as provided through the drill probe data garnered and processed through special software at the time the site was originally selected. The data base in the software may include such information as type of strata penetrated, temperatures, pressures and gasses encountered, thus enabling the selection of metals or metal coatings required for the installation casing. As the various modules of the Power Tube slide into position, as directed by their individually designed guide rails, they activate special sensors and switches as well as the seismic detector. As they complete the "positioning lock" circuit, an internal power supply may be activated. Once properly seated, the internal power supply may open the air start gate and run the various low voltage test and status circuits. The circuits may be displayed on a touch screen monitor that is part of the computer control monitor. The sensors and circuits may provide the information showing the temperatures at boiler level, both outside and inside, the pressures within the boiler system and that air start may be applied. In Power Tube models that also use the heat riser system, the thermal flow heat riser gate may be automatically opened after a certain RPM is reached by the air started turbine. The turbine is preferably air started. Once the nominal temperatures and pressures are reached within the boiler area, the flow gates to the turbine are automatically opened and the air start valve is automatically closed and the surface air start apparatus withdrawn. At this point, the Power Tube begins its five year service cycle.

Preferred embodiments of the present invention will now be described with reference to the accompanying drawings. It is understood that these illustrations are example embodiments as other configurations are also within the scope of the present invention.

FIG. 1 shows a system of data collecting used to determine the proper installation for the Power Tube in accordance with the present invention. Information may be transferred from a preliminary probe 10 by specialized software to a data collector and can be transferred to a plotter for final installation design that may include depth size of cavity, coatings required, metals required and configuration (i.e., Hot rock installation, heat riser installation or both). For ease of illustration, Power Tube 20 is shown next to the cavity as drawn by the computer software into cavity 12. In actuality, the Power Tube would then be installed within the cavity as shown on the computer with all the parameters indicated by the computer as dictated by the software. The level or depth of installation may also relate to the costs of installation and the coatings necessary to cover portions of the Power Tube that are exposed to rising thermal heat from lower levels that may carry a variety of corrosive gasses. These oases, permeable or impermeable, hot rock conditions and temperatures at the different strata 24 cannot be determined unless identified by a preliminary probe 10. The coatings may also insure a 5 year service period for the Power Tube 20 without mechanical attention and without metal degradation due to caustic acid matter contamination found in the rising thermal gases.

Figure 2:
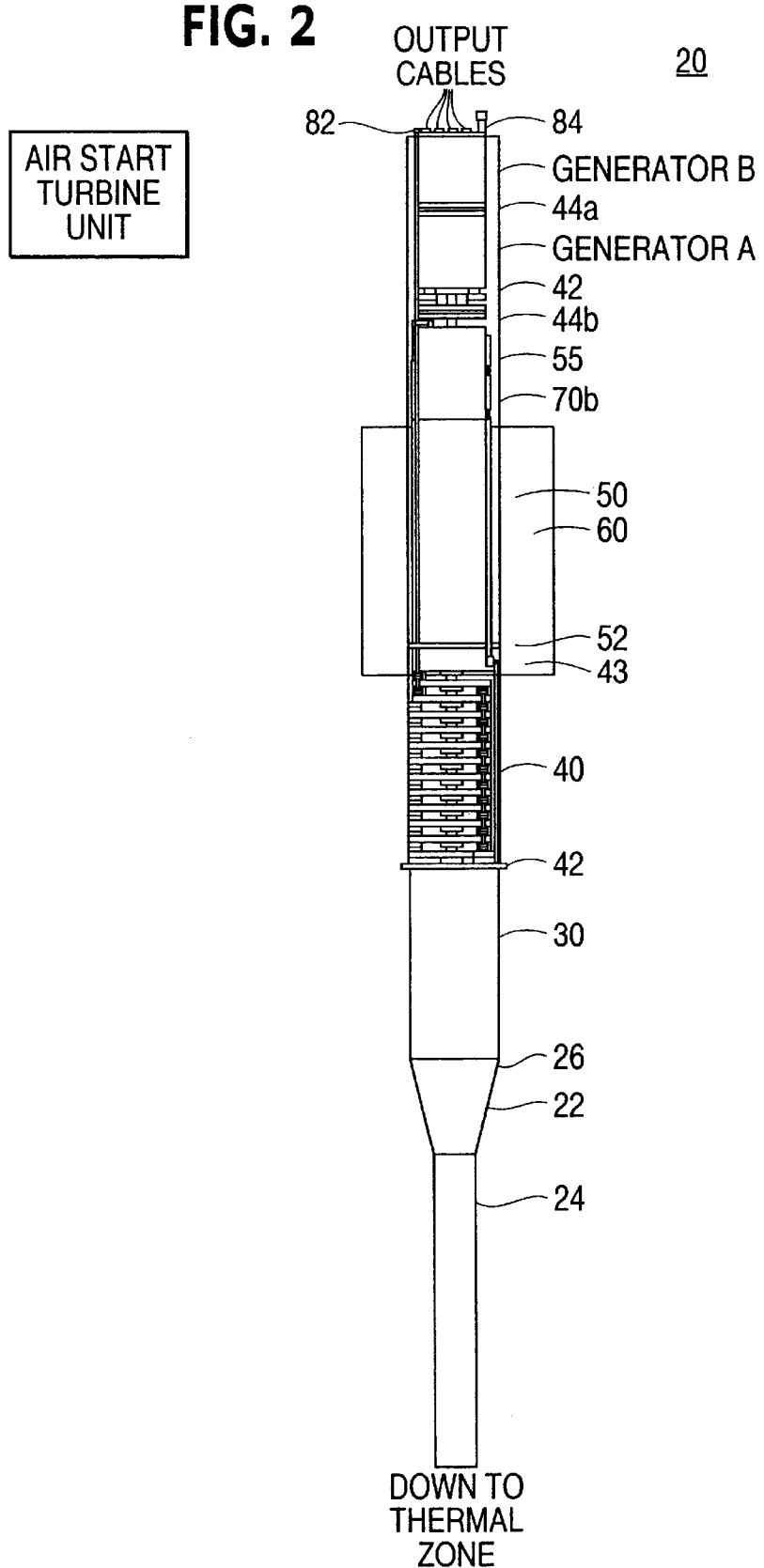
FIG. 2 shows the Power Tube and its modules and describes a heat riser installation in accordance with the present invention.

FIG. 2 shows the example of the Power Tube 20 and the four modules that comprise its structure, namely, the boiler module 30, the turbine module 40, the condensing module 50 and the generator or power module 70. FIG. 2 also shows an air start turbine unit that will be described below in greater detail. Each module has a special design rigid vertical rail, strategically and proportionately placed on the inner lining of the module that matches the rail guides on the outer down hole protective shield casing. As each module is lowered into position, they may engage the security contacts that form part of the closed circuit "fail-safe" system that either starts up the internal low voltage power supply. This circuit completion also engages the start program for the processor and main power controller and allows the air start, or upon separation at any point including a command from the seismic sensor, shut down the entire Power Tube. The three points of each module activate their own light emitting diodes (LFD's) that can be visually observed on the status screen when all 12 LEDS are lit up, all modules are securely in place and the circuit is closed and the start program of the processor and main power controller may indicate activation.

Starting from the bottom of the Power Tube 20, the thermal riser 24 serves to bring to the boiler area, the thermal energy it may find at lower depths. It may include a thermal jacket and a thermal riser capture cone 22 which may vary in diameter and the jacket may contain 6 or more tubes immersed in a sodium solution that becomes liquid at near operational temperatures. The sodium solution permeates the thermal jacket which is heat conductive and the thermal jacket may be placed directly in the selected geothermal resource at whatever depth it may be found. The circulating media within the tubes, surrounded by the sodium, now liquified matter, serve to insure temperature stability in the tubes while the Power Tube pumps circulate the heated media throughout the boiler area 30. The use of the thermal riser 24 installation may be used when limited hot rock is available. The thermal riser 24 is designed and insulated to provide minimum caloric loss and may be lowered to a depth of 7,500 feet where the average world wide geothermal temperatures may be 650 Deg. F.

The Power Tube 20 itself may not require installation beyond 500 Ft when a heat riser 24 system is used.

The boiler area 30 is the first module and preferably includes a harmonically balanced boiler that is in direct balance by design with the condenser system. This allows the process of producing steam, sending it through the turbine 40 and through the condenser 50 in a closed circuit, and for it to be done with a minimum of gates, pumps or valves. There is a by-pass spoiler 26 above the thermal riser cone 22 that opens in conjunction with a rotating updraft valve 44 (not seen here) with the boiler seating flange 42. The activation of these "valves" may co-inside with the demand for clearance of "cold" pockets that may be formed once in a while in the thermal riser area 24 as detected by the thermal riser 24 sensor. At this time, the processor as it receives the "cold" signal from the thermal rise 24 sensor may also invert the vector on the blades of the expeller/impeller 52 that up until that time was drawing cold air down from the surface and sending it through the condenser fins to draw up the cold air pockets and dispatch them to the surface allowing thermal energy recovery in the down hole shaft area at which time the rotating updraft valve 44 and the by pass spoiler 26 and the expeller/impeller return to their nominal operating conditions.

The boiler module 30 is designed to be attached to the Power Tube unit 20 directly below the tuned axial turbine 40. The boiler 30 may vary in size, depending on the amount of power that is to be generated. For example, in order to generate 10 MW of power, a boiler 30 may handle about 300 gallons per minute of propulsion media. Preferred boilers for use with the Power Tube 20 may vary in length but preferably maintain their diameter due to the constraints that come from both drilling equipment and original upper level Power Tube design 20. A 5 MW boiler preferably produces up to 40,000,000 BTU/Hr for propelling a 7,500 HP turbine. A 10 MW boiler may need to produce twice that amount within the same width but of greater length.

Figure 3:
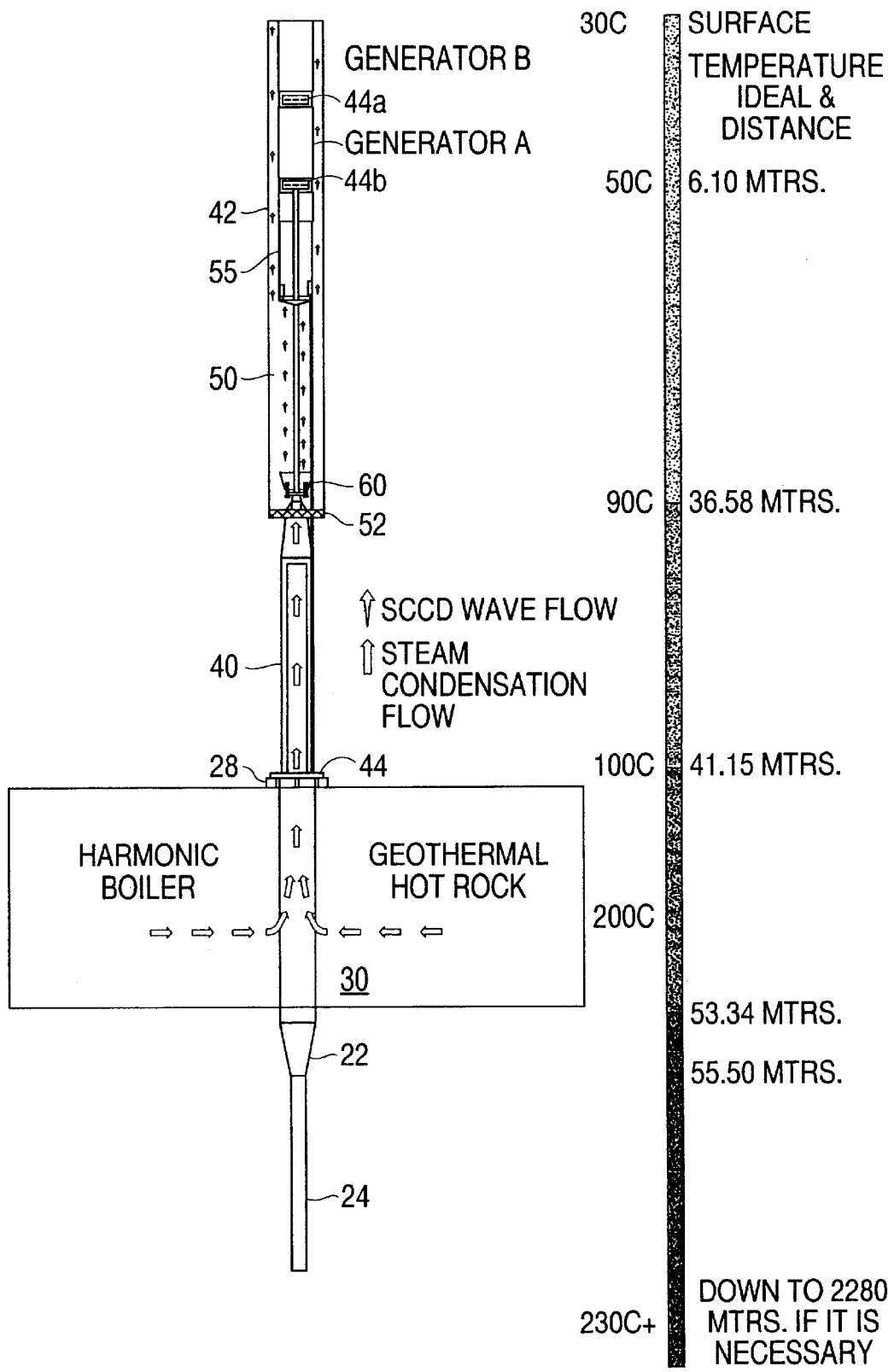
FIG. 3 shows the Power Tube and its modules and describes a hot rock installation in accordance with the present invention.

FIG. 3 shows the Power Tube 20 in a hot rock 62 installation. As can be seen, the boiler flange 28 in conjunction with the close fit of the boiler in the down hole position, may serve to sustain the boiler section directly in the hot rock 62 material. The boiler 30 exterior wall is also covered with a thermo conductive gelatinous non liquefying material that allows the boiler wall to receive total heat transfer from the hot rock 62 in regions where the hot rock is already moist, the heat transfer is not hindered. The gelatinous material also facilitates the extraction of the Power Tube 20 when it reaches the end of its service cycle. However both thermal riser and hot rock installations may be used at the same time though Power Tube will render maximum performance with either.

Figure 4:
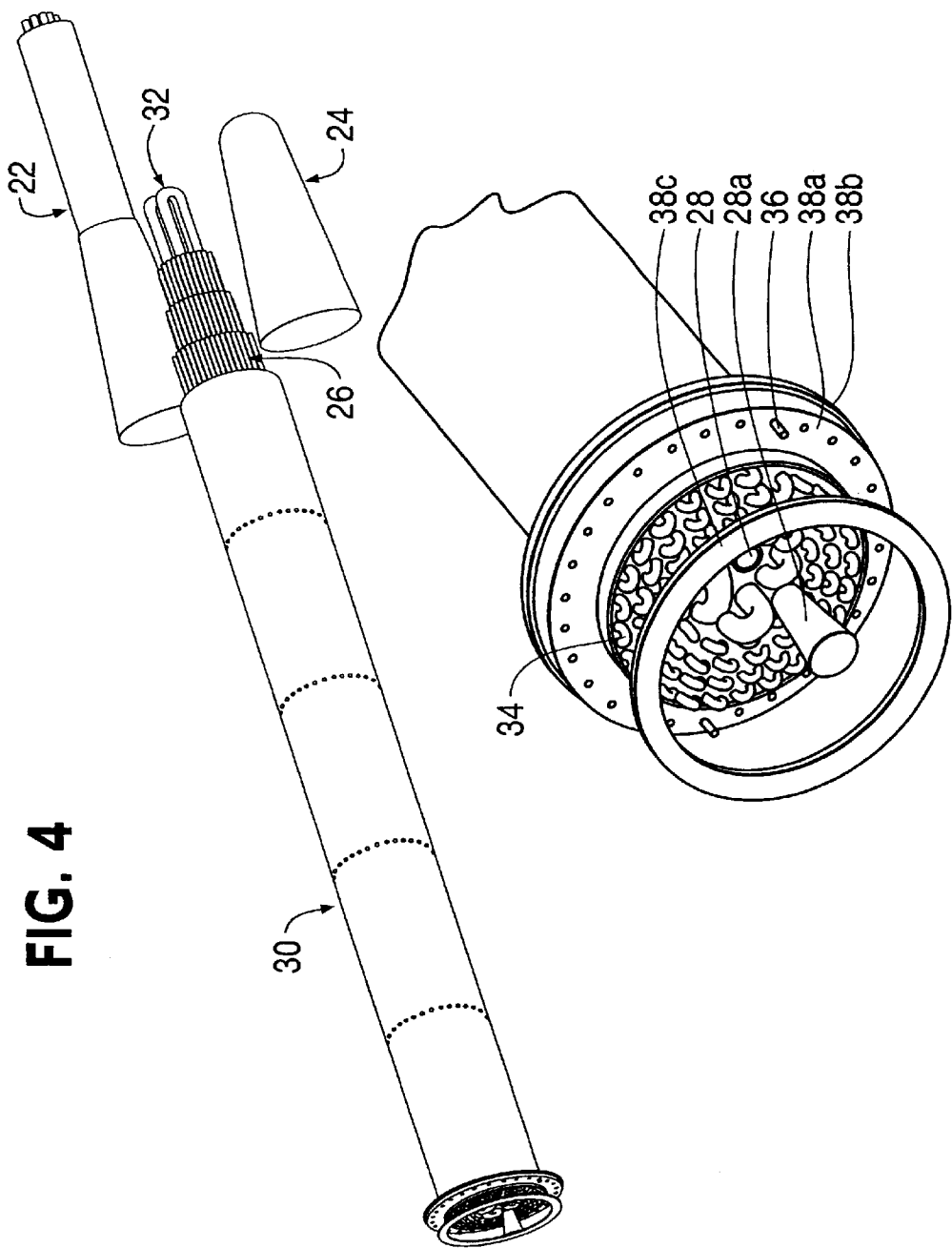
FIG. 4 shows the boiler and its internal design in accordance with the present invention.

FIG. 4 shows the boiler 30 and its design features. The Earth thermal end 32 is designed to maximize the capture of Earth thermal heat either through the riser accessory or through its encasement wall. The internal content of the casing contains a sodium material that liquefies at a temperature just below the minimum systems operating temperature. It is a perfect heat conductor and insures internal temperatures throughout the boiler 30 are uniform and stable. Also a redundant plurality of tubes 34 are contained within the boiler 30. The lower end or Earth thermal end can either be fitted with a termination cone 24 for hot rock installations or a heat riser cone 22 just below the by pass spoiler 26 whose length may vary in accordance with each installation.

The tubes inside the boiler 34 may be made of any boiler standard material and in certain cases where the design is made to be airlifted, out of titanium. The tube array may consists of concentric circles of tubes and each arrayed circle may be of different length. The first circle may be 35 inches in diameter containing 50 1-inch tubes whose ends are attached with elbows so as to produce a continual unisurface throughout the boiler thereby elongating the total heat surface area the propulsion liquid must travel within the boiler as it builds up pressure and turns to steam before entering the turbine 40. The second circle of tubes may be 28 inches, also 1-inch in diameter tubes containing 40 tubes in the array. The third circle of tubes may be 20 inches in diameter, also 1-inch tubes 30 in number. The fourth circle 15 inches in diameter with the tube array numbering 20 1-inch tubes. The last of the one inch tube arrays are attached by special elbow to the first of the 2-inch tube arrays in the fifth 10 inch circle whose tubes number 8. The lower end of the 8 inch tubes are uncapped and welded to the heat riser tubes when the installation requires it. The final 2-inch output tube, 36 from the boiler is connected to the electronic turbine input gate control valve. The input gate control valve 8a is monitored by the PLC controller. The input end 1-inch return line 28 is attached to the third return turbo pump. The total non interrupted boiler tube circuit in conjunction with the required geothermal energy may provide the required steam flow and pressure to supply the turbine 40 with sufficient propulsion to generate the equivalent of 15,000 HP. The boiler seating flange 38a fastens directly to the turbine interface flange (not shown) and the joint is secured by a 1" thick composite insulative, metallic, corrosion resistive gasket 38c. Pin guides 36 may be used on either side, to align the turbine flange (not shown)with the boiler flange 38a. For seating purposes within the down hole hot rock, a down hole seating gasket 38a which may be 6 inches thick and made of multiple composites metallic separators and corrosive preventive materials, serve to both secure the sealing of the down hole cavity with the Power Tube and may serve as well to facilitate its removal when its life cycle has been reached and must be replaced.

The boiler 30 is preferably harmonically matched to the condenser 50 by having the same total area surface with the same initial thermal conditions but in reverse order. The steam that turns the turbine 40 is formed in the same volume as it is condensed in the condenser 50 at near the same rate of condensing to steam formation at the same time, albeit in reverse order thus minimizing the requirements for redundant pump and valve action to engender the transference as it traverses the closed loop of an unending circuit. Stated differently, at any given moment, in an area of both the boiler and the condenser, an equal amount of volume of matter is changing state. In the boiler 30, it is going from liquid to steam. In the condenser 50, it is going from steam to liquid.

Additionally to enable the condenser to match the opposite heat performance of the boiler, it is assisted by a system referred to as the "super cooling condensing driver" 50 and SCCD 50A. This device allows the condenser to gain proportional volume on the boiler 30 by reaching a near flash cooling condition in the sector that refrigerates the upper condenser coils. Here an acoustically resonant chamber through which harmonic sound waves are compressed at one end 50 A-1 and slowly released at the other 50 A-2, produce rapid cooling that can be compared to holding the trigger handle on a fire extinguisher and feeling the ice cold valve as the gas rushes out, in this case instead of gas it is sound 50A.

Figure 5:
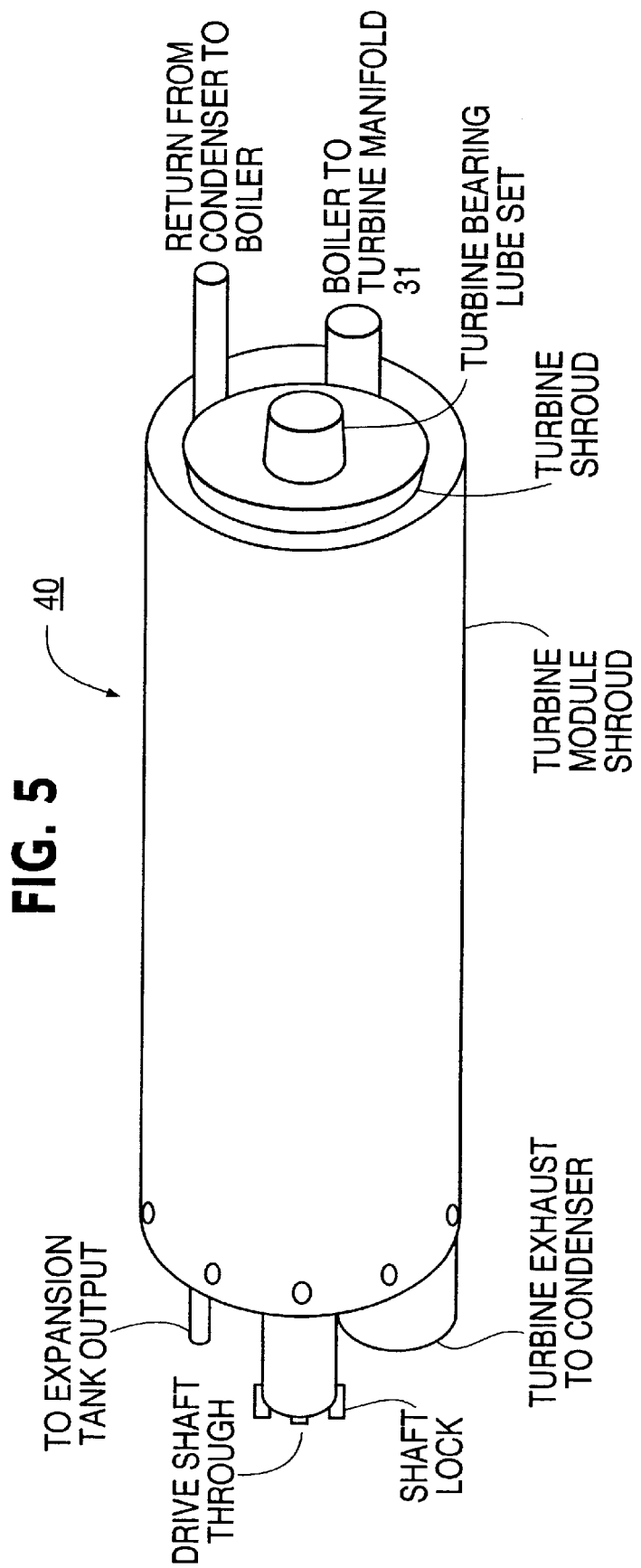
FIG. 5 shows the turbine module in accordance with the present invention.

FIG. 5 shows the turbine 40 that is designed to fit within the Power Tube assembly 20 as a modular unit. The shaft of the turbine 40 traverses the area of the condenser 50 and the expansion tank 55 unit and meets at the level where the transmission 56 is located just below the generator 70 The transmission is preferably designed to take the 3,600 RPM of the turbine 40 and reduce it to 900 RPM. The transmission insures that the generator 70 will turn in the opposite direction as the turbine 40 to avoid creating a "system gyro torque" that would come from the two masses rotating in the same direction over a long axial plane. The 10 MW turbine is preferably designed to produce 15,000 Horsepower. Most turbines are designed with various stages to enable a pattern start up through the various stages. The Power Tube 20 preferably has one diameter stage, i.e., preferably within thirty six inches 40c but may be segregated into more than 20 separate sections and started with compressed air 40a.

The start up of the turbine 40 is preferably achieved by a surface air compressor not shown. When sensors detect that the turbine speed has reached the appropriate RPM and the pressure in the boiler 30 has reached the proper pressure, then the gate valve between the boiler 30 and the turbine 40 will be instructed by the automatic controller to release the steam from the boiler into the turbine manifold where the boiler input 40d is located. Then, the air start will be automatically disconnected and the Power Tube will be set in automatic motion for a period of time which preferably is 5 years. The turbine 40 is preferably made of titanium or stainless steel.

The upper end of the turbine area 40 is designed to traverse through the condenser 50 and provide power for the condenser expeller/impeller 52. The expeller/impeller 52 is located between the harmonic condenser 50 and the turbine interface diffuser 43 and acts as a stabilizing flywheel engendering the inertia necessary to overcome the static condition of the generator 70 as the clutch engages without appreciably slowing down the turbine 40. The expeller/impeller 52 brings air down from the surface to provide an updraft that drives the remnants of the SCCD cooling activity 60 to the surface and induces thermal activity through the thermal riser capture cone 22 and the rotating updraft valve 44 when needed to remove lower temperature pockets from the thermal system as commanded by the sensor and control system that would cause the vector on the rotating blades thirty six in number, to shift from down draft to updraft mode and back as required. The condenser fan may rotate at 3,600 RPM, causing the air vortex to flow through the condenser fins 54, e.g., preferably 18 sets of fins adding to the rate of condensation of the steam within the condenser 50. The condenser expeller/impeller 52 sits on its own bearings which are cooled through a closed loop oiling system.

As discussed above, the condenser 50 is preferably harmonized with the boiler 30. The harmonics are due to the perfect matching of the total cavitational area within each device so as to mirror each other. The activity that takes place in each takes place in reverse order due to the harmonization of the boiler 30 and condenser 50 causes the need for pumps and valves between the two to be minimized. The condenser 50 may include a series of pipes, tubes, cooling fins, and an active flash cooling system that may be referred to as SCCD 60. This may also serve to cool down the oil bearing circulation system 66 (FIG. 7) as the cooling coils for the refrigeration cycle cylinder coil around a portion of the SCCD 60 cooling system.

Figure 6:
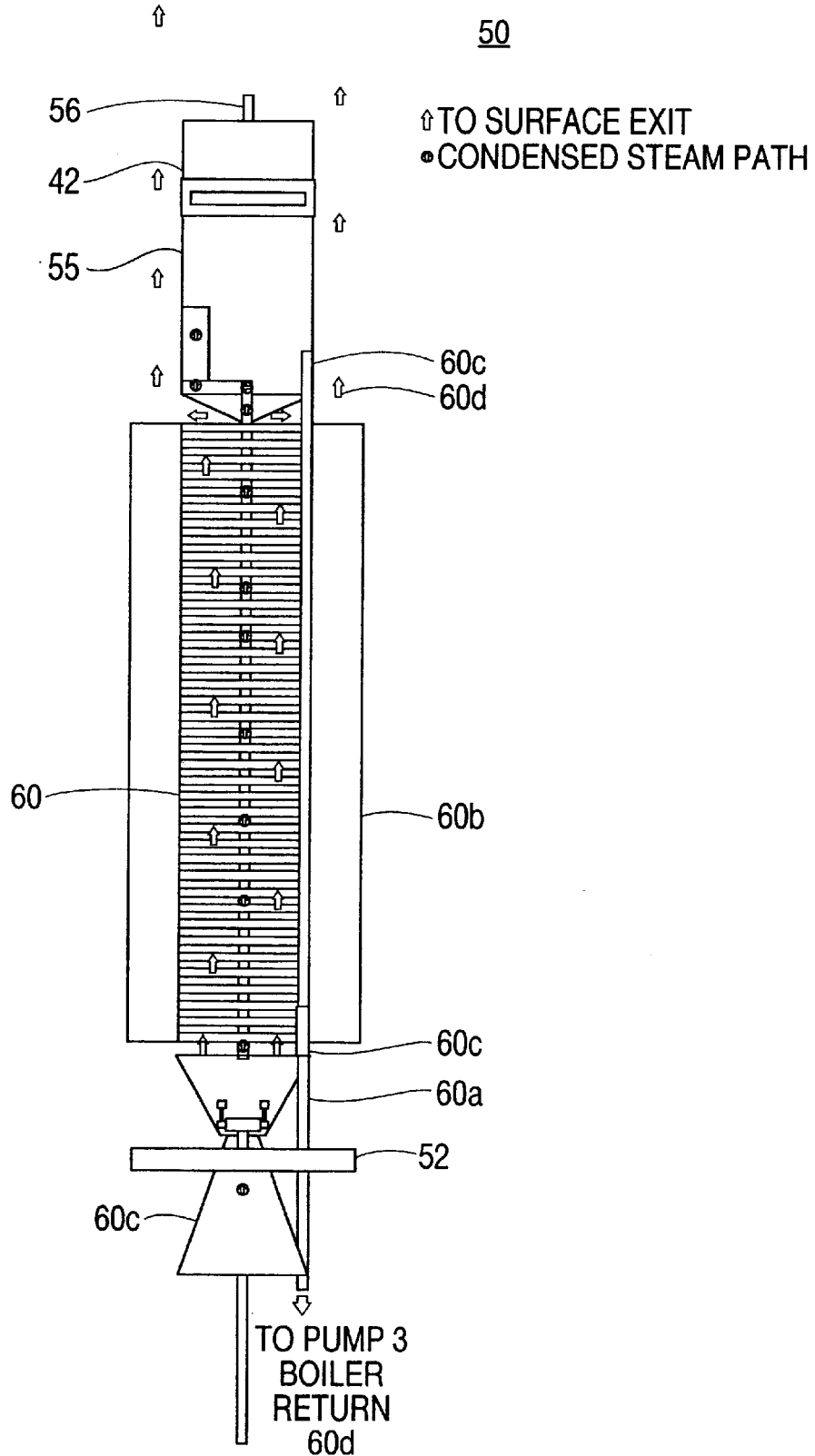
FIG. 6 shows the harmonic/super cooling condenser driver and condenser system in accordance with the present invention.

FIG. 6 shows the harmonic condenser 50 condenses the steam back to liquid. An upper level cavity insulated onto itself below the expansion tank houses the cooling system for the lubricants. The expansion tank 55 may also be located just above the exit of the condenser 50 to hold the condensed steam now liquid and to balance the liquid flux at different atmospheric values and temperature conditions. Since the surface temperature and the cavity temperature change between night and day, this volume will also appear to change and therefore the need for expansion tank 55. The expansion tank 55 preferably holds 150 gallons of liquid and an additional 20% of that volume for cavity space reserved for expansion and contraction which by volume represents 25% of the total liquid for the system. The shaft 56 that originates with the turbine 40 ends at this point and tapers into the clutch mechanism 42 which is connected to speed reducer or transmission in the gear box 42. The speed reducer in the gear box 42 acts as a transmission that allows the generator 70 to turn at 900 RPM. The slower generator speed insures longevity for this type of generating system such as the desirable 5 year maintenance free period. Both the speed reducer in the gear box 42 and the bearings of the clutch mechanism 42 may be bathed in recirculating oil that comes from a specially designed oil cooling system.

The expansion tank 55 is preferably made of stainless steel. As liquid reaches the secondary level of the expansion tank 55 it is pumped by 3 sets of in-line centrifugal turbine pumps, each of which has its own redundancy. Each of the redundant pumps is preferably designed to operate the equivalent total time of the service period of 5 years, but programmed to run each intermittently for a total of 2.5 years one half of the service cycle. Therefore, the control cycle allows one pump to function while the other rests. However should one pump fail for any reason, then the other pump may take over Failure of any of the two pumps is detectable by the sensor system that is described below and can be seen on the monitor screen for that unit at the central control. When the sensors detect that the volume of steam in the boiler 300 is reaching a "recharge level", then the appropriate valve opens, allowing the pressurized water to reach the boiler 30 whereupon the gate to the boiler 30 closes and the liquid continues to convert to steam thus beginning its power cycle through the turbine 40. The recharge level is the level at which the remaining steam has reached minimum allowable levels and must be added to maintain its pressure at required flow levels in order for the turbine 40 to operate. Located in the harmonic condenser 50 may be the super cooling condenser driver 60. It may be driven by the SCCD oscillator and oscillator control 60*a*. The cavity shown as part of the SCCD system is an acoustic, resonant, turned cavity at the base of which fixed, single frequency sound is generated. This sound may be a fixed oscillation provided by mechanical or electrical means.

The cone of the oscillator is designed to provide acoustic wave compression within the resonant acoustic cavity and at a given decibel rate. At the lower end of the cavity where the wave is formed and compressed, heat is generated which must be carried away by the radiation fins 60*b* which also serve to carry away heat from the exhaust steam of the turbine entering the lower vacuum line 60*c*. The upper level of the SCCD 60 contains electronically controlled "escape gates" near the wave pressure path exit 60*d*. The gates release the compressed acoustic waves at a rate that produces rapid cooling at the upper level of the SCCD 60. The harmonic condenser 50 also contains the coiled tubes that decrease in size from the 6" vacuum line 60*c* and eventually reduce to a 1" line that enters the expansion tank 55. The radiation fins 60*b* are comprised of 180 radiating honeycomb fins through which the condensing tubes pass. These vertical fins radiate out horizontally from the SCCD cavity casing every 2 deg. from their axial center. The expeller impeller 52 is designed to draw cold air down from the surface and push it back through these fins at the rate of 15,000 Cu/Ft/min adding to the removal of heat from the condenser system. The liquid as gathered by the expansion tank is pumped back into the boiler through the return line 60*d* by the various turbo centrifugal pumps 60*e*.

Above the expansion tank 55 in the gear box 42 may also be found a separate vibration and temperature insulated cavity that contains the early start up electronics for the Power Tube.

Figure 7:
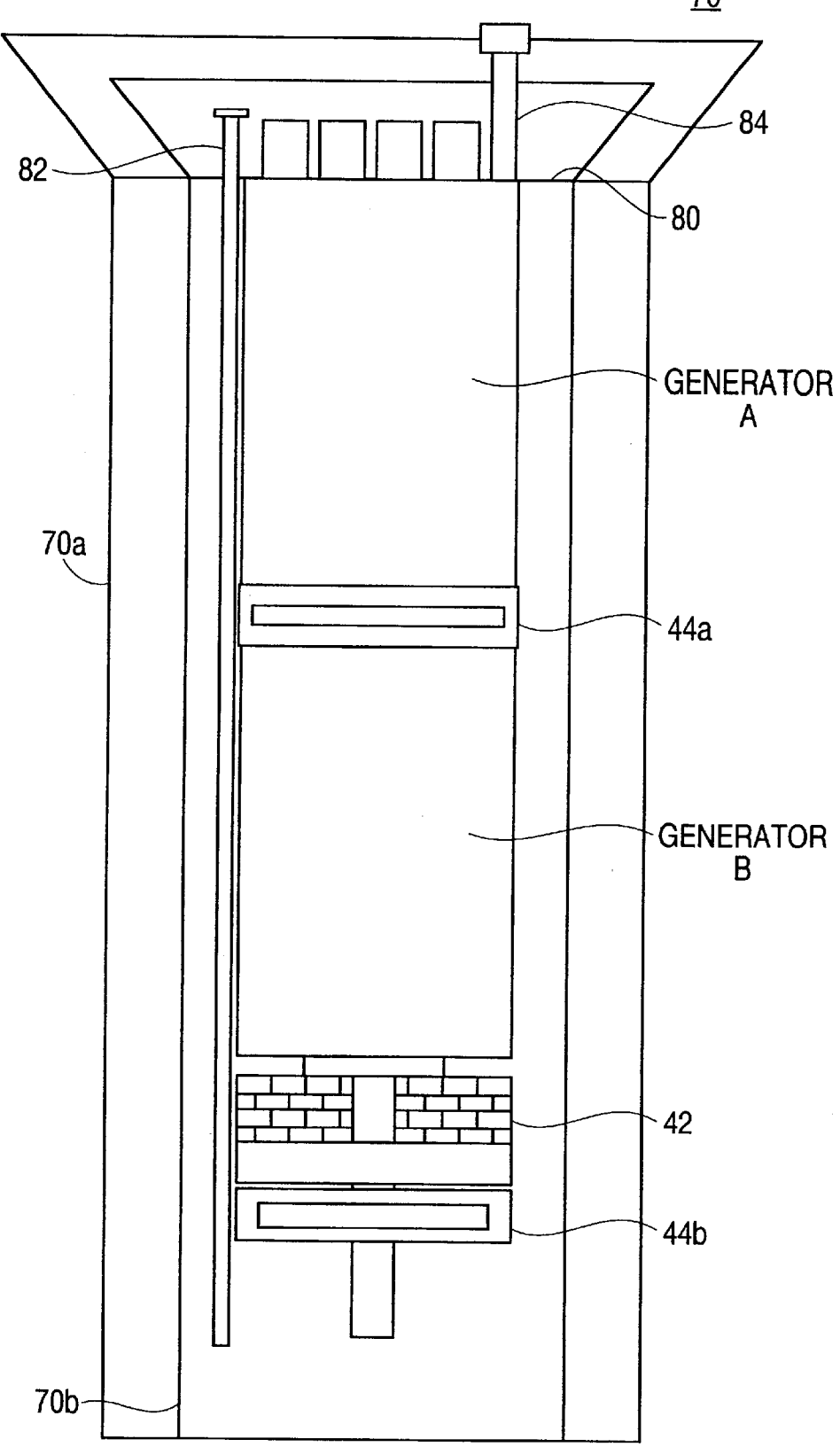
FIG. 7 shows the generator (s) module and with gearbox and centrifugal clutches in accordance with the present invention.

FIG. 7 shows the generator module 70 is preferably located at the top of the Power Tube 20 structure and is centered over the transmission gear box 42 and power drive shaft. The generator preferably is of the brushless type in that it has an exciter, a rotor and a field. The generators rotate in the opposite direction to the turbine 40. A preferred generator system deliver 10 megawatts of power at 90% of maximum 900 RPM under a 125% load. The preferred generator assembly may be "piggy back" installed due to the need to maintain the diameter within the required down hole size of the installation thereby staying within the economic window that may make the installation viable. The generators are matched generators separated by a centrifugal clutch mechanism 44*a* that allows the first unit generator A to reach 50% of its mass rotational speed, before engaging the second unit generator B. The preferred units produce in tandem 10 megawatts, each producing 5 megawatts. The total preferred output is 13.8 KV with a three phase delta Y configuration at 60 Hz, but may also be made at 50 Hz and different KV outputs as used in certain other countries. The total generator output is the type that may be driven by the turbine 40. Centrifugal clutch 44*b* serves to engage the transmission that may also be known as the speed reducer in the gear box 42 and turn the first generator A before centrifugal clutch 44*a* engages the second generator B after reaching 50% of its nominal speed.

The output platform 80 may serve as a base to plug in the output cables and control systems 84 from the sensors and start up electronics package to enable the computer control system to take over and operate the Power Tube 20. The air start 82 are the downward and return lines that go directly to the turbine 40 for the air start operation. The air start operation is automatic in that as a unit is placed in position the temperature begins to build from the geothermal energy surrounding it. However initial steam pressure is insufficient to start the turbine 40 but is designed to keep it moving after initial momentum and mass drag has been overcome. The air start 82 is designed to get the turbine 400 up to its operating speed. The sensors return the required information to a processor that analyses the boiler temperatures and pressures and dictates to the various valves and pumps the commands to operate and open. At this point, the air start 82 shuts down as the turbine 40 is now operating off the developed steam of the boiler 30 then the air start cables from the surface compressor are unplugged at the platform level and withdrawn from air start 82. The Power Tube 20 is preferably now in operation for a desirable 5 years. A control cable 84 may also supply the status information of the entire system. The down draft 70*a* and updraft casing 70*b* outline are shown. The outer casing allows air by the expeller impeller 52 to be drawn down to below the condenser level at the rate of 15,000 Cu/Ft/min. and force it up again to the surface through the cooling fins and thermal effluent diffuser of the SCCD 60.

The centrifugal clutch 44 found below the gear box 42 may be designed to engage the mass of the generator 70 just above it when the shaft speed turning the centrifugal clutch 44 reaches 50% of the nominal generator speed. In the case where two generators A and B are used to generate 10 MW, another clutch 44*a* may also be found, it in turn engages the second generator mass at 50% of its operating speed. This allows mass momentum from the turbine 40 which is air started, to build up through the expeller/impeller 52 and the gear box transmission 42 without braking the acceleration of the turbine as it and the other mass rotational components reach their final operating RPM while the turbine 40 transitions from air to steam.

Figure 8:
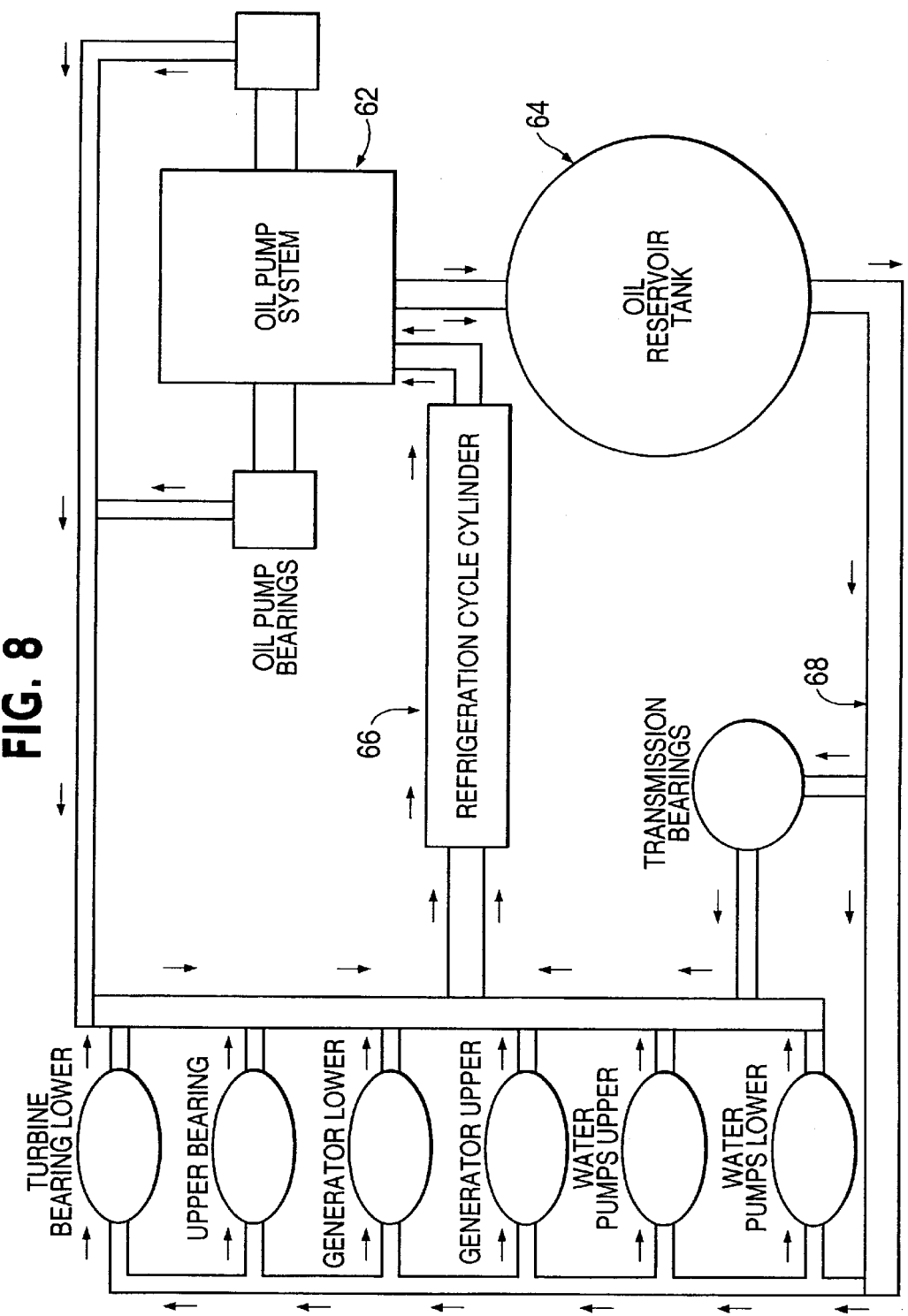
FIG. 8 shows the oil cooling system in accordance with the present invention.

FIG. 8 shows the oil pump 62 is preferably located near the water pumps to keep the flow cool and steady of specially developed synthetic oil flowing through the various systems in the Power Tube 20. The oil pumps 62 also keep oil flowing through the refrigerating system that lowers the circulating oil to a maximum of 90 degrees Fahrenheit. This insures that there will be no or very little molecular breakdown and that its viscosity will remain through out the longevity of the Power Tube 20. The oil pump 62 are also redundant and serve as back up for each other taking turns so that each works the equivalent of 2.5 years rather than 5 years. If one unit fails, then the other will carry the load to the end of the work cycle. Failure of either unit can be viewed on the monitor screen at the central control station. As can be observed the re-circulatory system may take the oil with higher temperature caused by the heat removed from the friction of bearing and other friction surfaces through a cooling process which is passed through the refrigerating cycle cylinder 66. The cooled oil is stored in the oil reservoir tank 64 which has 10 gallon capacity plus a displacement space reservoir that may handle the fluctuations in lubricant reserve levels. The total system is 20 gallons, one half in the cooling reservoir system, the other in the circulatory system. All lubricated systems on the power components are sealed bearing. Oil flows through the bearings as shown in one side and out the other side, having bathed and lubricated the bearing or friction surface in motion as the lubricant flows through.

Figure 9:
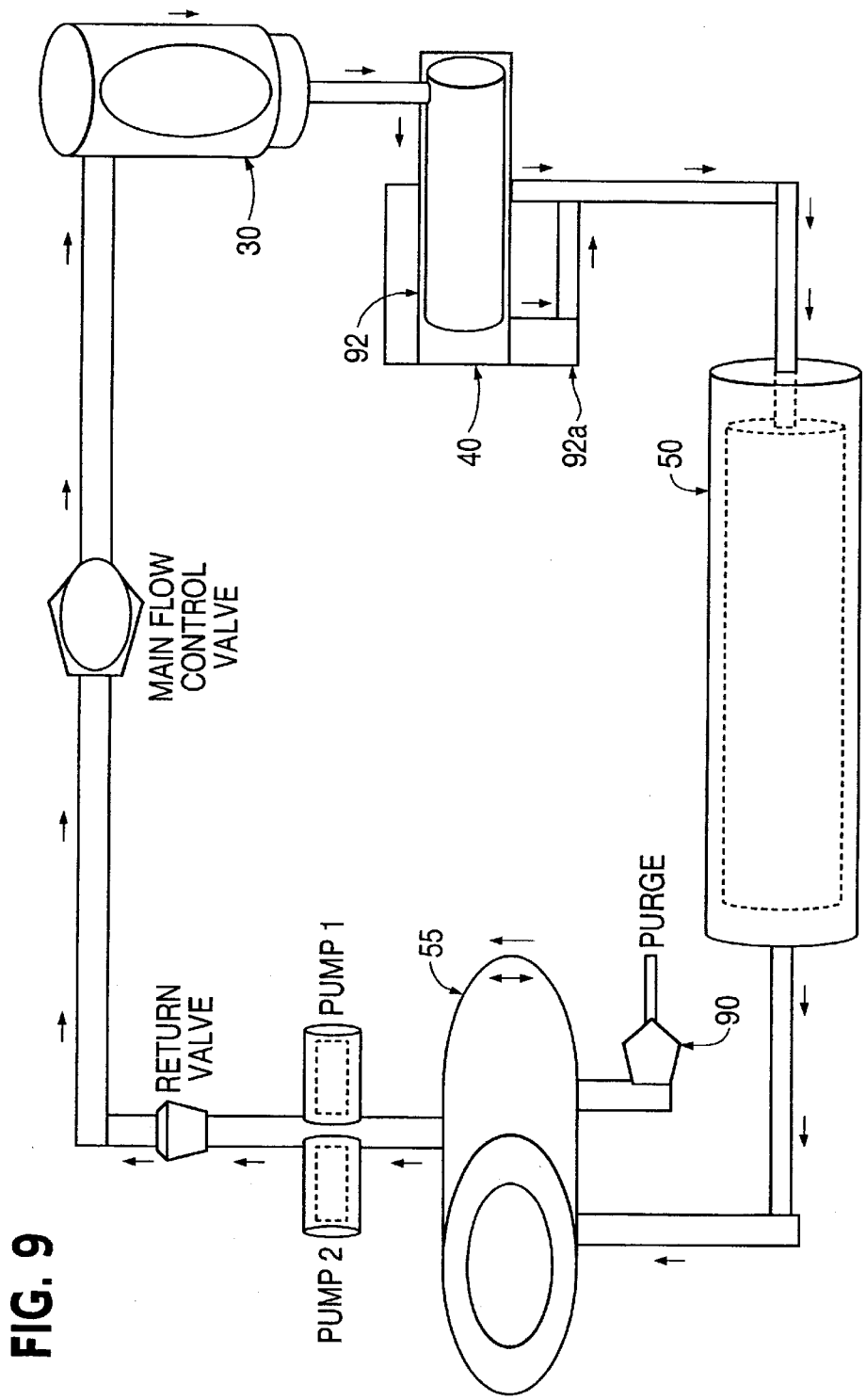
FIG. 9 shows the closed media circuit where liquid turns to steam and back to liquid again in accordance with the present invention.

FIG. 9 shows the closed circuit that the medium (i.e., sterile, degassed and demineralized water) takes to performing the task of turning the turbine 40. The circuit contains a purge valve 90 that eliminates any air in the circuit that may have been left form the air start or from the compressive pumping activity while the media is rotated in this closed circuit. The valving system will also remove any air in the system that may act as an undesirable vacuum in the system, or that may create undesirable water hammer effects within the circulatory system at any given points. The air purge valve 90 is hooked to the exhaust side of the air start valve and works in unison with the pressure build up of the system, removing air pockets and retaining the medium in either steam or liquid form. The gland condenser on the turbine 92 feeds the accumulated excess condensation back through a diverter valve connected to a vacuum pump 92a straight into the harmonic condenser line. This is controlled by the "cycle vacuum pump" 92a that runs only when the sensors indicate appropriate accumulated levels of condensation in the gland area.

Figure 10:
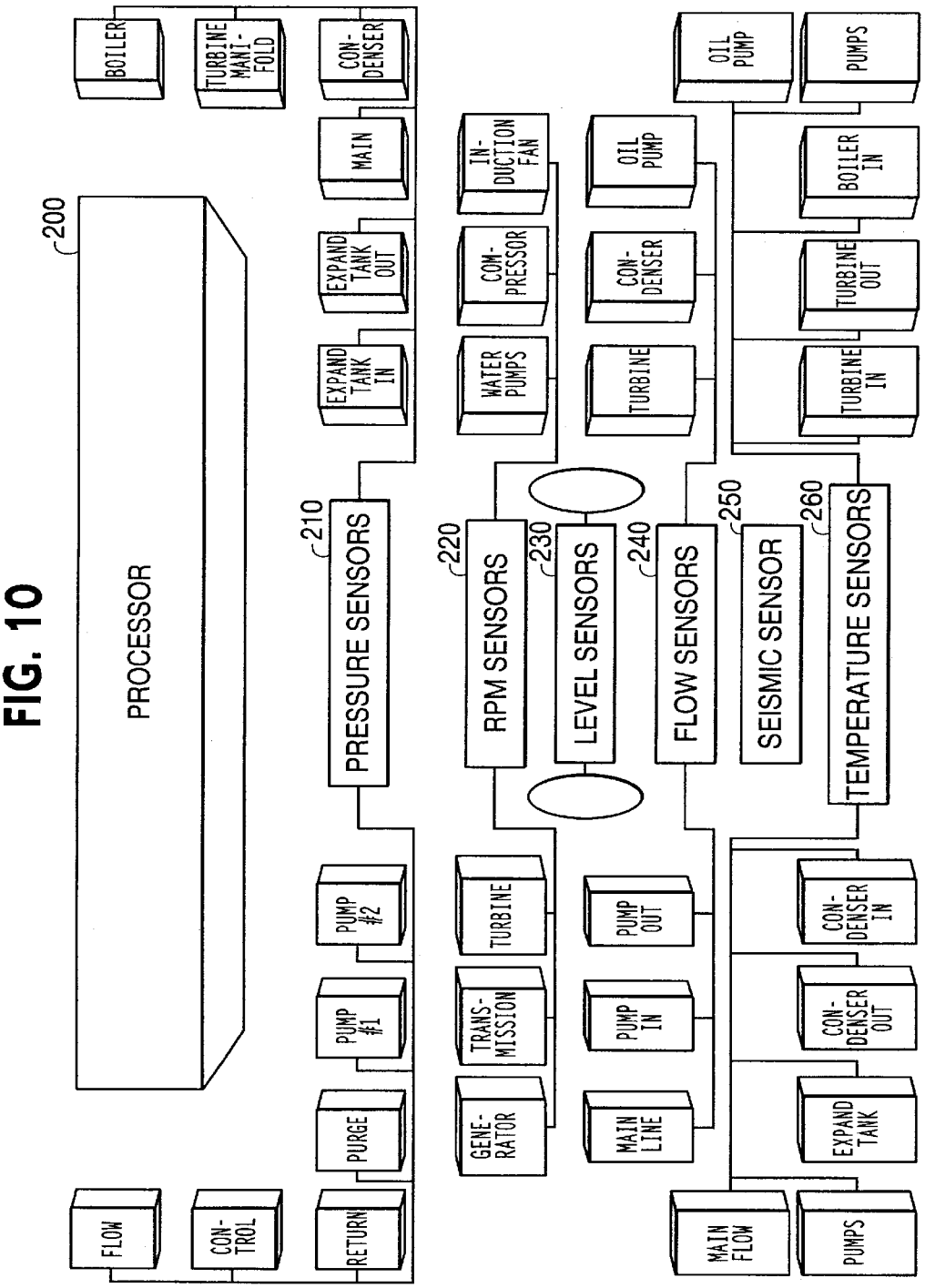
FIG. 10 shows the sensors whose various signals are processed in accordance with the present invention.

FIG. 10 shows a processor 200 that may send digitized encode and decode signals between sensors and the processor 200. FIG. 10 shows six sensor levels, including pressure sensor 210, RPM sensors 220, level sensors 230, flow sensors 240, seismic sensor 250 and temperature sensors 260. Each of these sensors may be separately and independently connected to the processor 200 through the buss bar through singular or parallel digital encode/decode digital signals. The sensors vary in the nominal read out and may have different limit settings. The sensors indicate to the control center through the processor and computer up-link that the circuit is maintaining all the required parameters at every valve, gate, pump and conduit to maintain the required balances necessary within the parameters of the fluid and steam circuit at all times. The pressure sensors 210 preferably monitor the main pressure which will vary with the size of turbine being propelled and the size of the generator being turned by the turbine. The pressure sensors monitor the required parameters as set for the individual power requirements in the boiler 30, expansion tank 55 harmonic condenser 50, the purge valve 90, and insures the balance between the required boiler 30 back pressure to be overcome by the main flow pumps and the pressure drop requirements in the condenser 50. And the balance levels of the expansion tank 55, that may maintain the optimum power output as may be required. Parallel lubricant pressure sensor maintains the control of the lubricating pressure at given points, mainly those at the plurality of bearing entrances. The ratio of pressures between the lubricant entrance side of the bearing and the exit side of the bearing as the lubricant returns to the refrigerant cycle cylinder 66 is 2 to 1. The fluid is pumped out of the oil reservoir tank 64 into the bearing side of the equipment 68 at 120 PSI As the hot lubricant flows through the refrigerant cycle cylinder and returns to the oil reservoir tank 64, it's pressure is reduced to 60 PSI. This reduction is caused by the loss of heat as it travels through the refrigerant cycle cylinder 66.

The RPM sensors 220 preferably monitor the nominal speeds of 900 RPM at the generator 44a or 44b (or both) level a preferred transmission 42 ratio input shaft of 3600 RPM and primary reducer of 1800 RPM with secondary reducer to a drive shaft output of 900 RPM. The turbine water pumps preferably at 3750 RPM, the turbine vacuum pumps at 6000 RPM and the SCCD oscillator 60 within the RPM parameters of a given design for the resonant acoustic compressor chamber required to work with the given power output design of the chosen unit (i.e., 1 MW to 10 MW). Also monitored is the expeller impeller 52 at 3600 RPM.

The level sensors 230 check the levels of the boiler 30. They check the level of liquified sodium solution in the boiler tube section and when the thermal riser 22 may be used then the total level of sodium solution. Additionally the sensors may be used to check the liquid levels in the expansion tank 55 and the boiler 30 as well. There may be a parallel level sensor used in checking the lubricant level within the oil reservoir tank 64.

The flow sensors 240 preferably monitor such that the main line flow is under nominal parameters as may be required by each individual power system, i.e., 1 MW to 10 MW. The circuit monitored by the flow senors begin at the main flow control valve then into the harmonic boiler 30, then exiting the boiler it may monitor the flow through the turbine 40 then the pipeline to harmonic condenser 50 up to the pumps in the expansion tank 55, then monitoring the flow as it once again passes the pumps and return valves to the main flow control valve. The measurements are both n Gal/P/min and Ltr/P/sec. The flow normally is slow and under pressure before entering the boiler, then it accelerates within the boiler 30 as it becomes steam, the flow is at its maximum going through the turbine 40 and begins to slow down as it enters the harmonic condenser 50 where it decelerates as it loses temperature. The flow is slowest just before entering the expansion tank 55.

A parallel flow is measured by the adjacent lubricant flow sensors that may monitor the lubricant as it traverses the lubrication circuit. This sealed circuit maintains a lubricant flow, at the rate of 30 gal/min.

The seismic sensor 250 is unique among the other sensors in that it draws standby power for a quiescent source within the electronic housing 42 in case there is a shut down of the Power Tube 20 during unacceptable seismic activity. The seismic sensor may use the power developed by the Power tube to power its circuits during normal operation when seismic activity is below six on the Richter scale. After reaching six on the Richter scale, the seismic sensor may begin to transfer to its quiescent reserve circuit which comes alive as the seismic activity reaches 6.5. Richter. At this point, the Power Tube 20 shuts down and all generating power by Power Tube 20 stops. The internal power supply circuit continues to send out seismic signals to the uplink system that also has its own standby emergency power supply. Both devices, the six axis sensor and the uplink power supply may be built to provide 72 hours of reserve power.

The seismic sensor 250 is a six axis sensor that is purposefully designed to monitor world seismic activity as it is envisioned that eventually thousands of Power tube units will be buried at respectable depths around the world. The seismic sensor is also designed to maintain active circuitry for prolonged periods at temperatures of 360 Deg. C.

The temperature sensors 260 preferably monitor the system such that the main flow of the liquid material is below its boiling temperature while under pressure and before entering the harmonic boiler 30 and at high temperature while under pressure while entering the turbine 40 then beginning to return to below boiling under pressure temperatures as it enters the harmonic condenser where it loses most of its pressure and accumulated temperature. Since it is envisioned that many liquid formulas will be used to accomplish the task of acting as the prime turbine mover, the specifics of the liquids used will create a very wide scale of variance between the numbers used to represent boiling under pressure, cooling at low pressure and flowing along the closed circuit at various points. A basic example may be using water as the liquid media where it's working pressure temperature would be 600 Deg. F, its condensing temperature under pressure may be 250 Deg. F. On the other hand, pentane fluids may be used where its working under pressure temperature may be 325 Deg. F and its condensing under pressure temperature may be 85 Deg. F.

Figure 11:
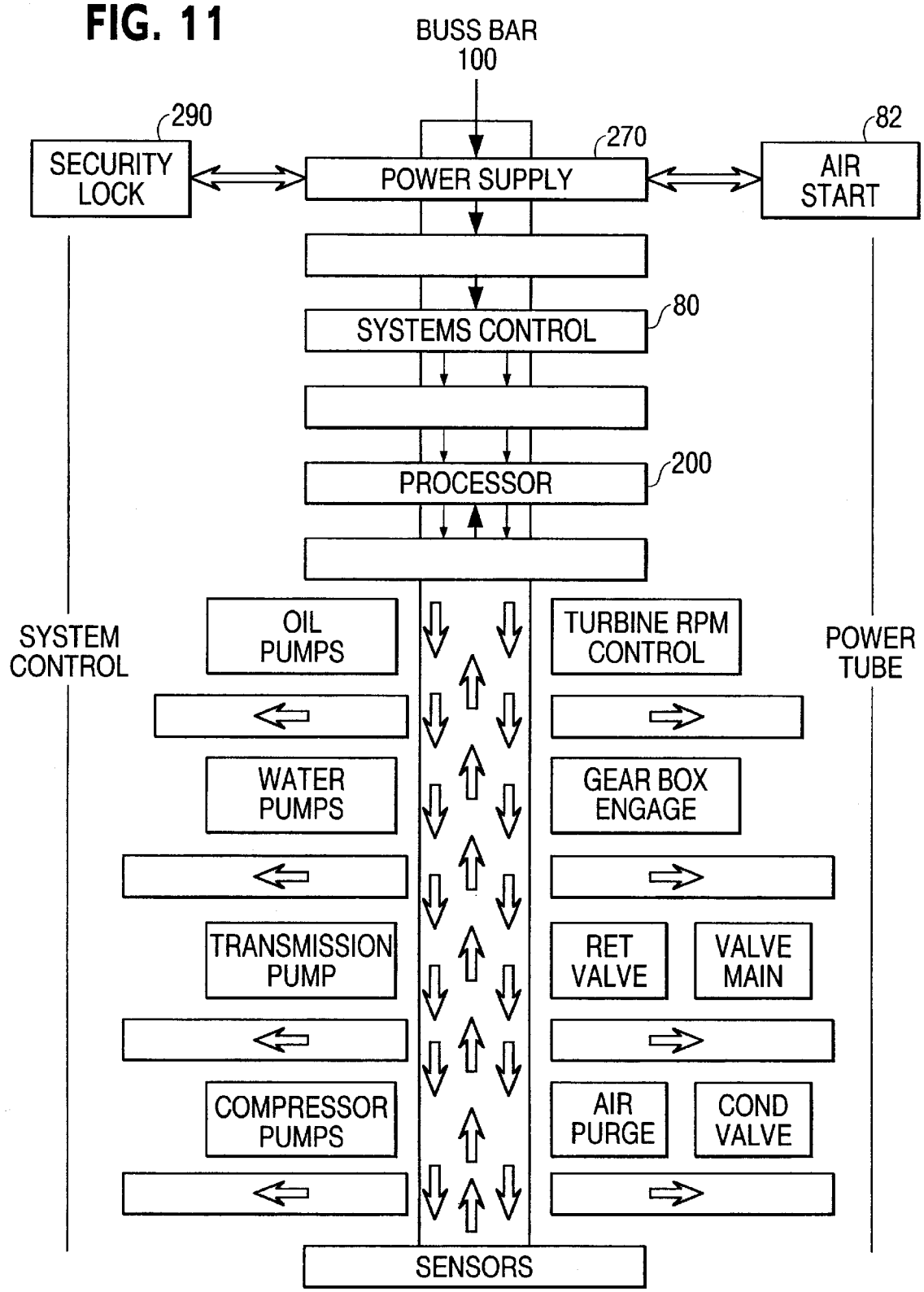
FIG. 11 shows a processor buss bar that handles the signals to and from the systems control in accordance with the present invention.

FIG. 11 shows an example of the embodiment of the buss bar 100 which preferably is a copper strip of metal 1-inch wide and having a thickness of ¼ inch. The buss bar is routed through out the Power Tube by ceramic stand-off clamps that not only secure it to the body of Power tube but at junction points act as miniature clamps to fasten the terminals of the sensors and other electronic equipment to the main buss bar 100. The buss bar 100 is preferably used to avoid using standard wire to connect to the different devices. If wire were used, the temperature within Power Tube may eventually cook and make brittle all the insulation on any wire. The buss bar 100 allows digitally encoded and decoded signals to be sent simultaneously through the buss bar 100. These signals may use the same buss bar and not interfere with each other due to their encoding and decoding. Thus only the messages from a device or sensor that was sent to a given unit, be that a pump switch or a valve, would be answered by that unit because its coded receiver accept that incoming message which tells the valve to open or close the pump to start or stop. Using the buss bar as the carrier of signals helps eliminate 2,800 pounds of wire and insulation that may not stand up to the prolonged temperature environment required for the operation of Power Tube. The processor 200 handles the codification of the incoming and the outgoing signals from the systems controller 280.

The power supply 270 preferably does not go on until the security lock mechanism 290 indicates that the lateral sensors and modular locator sensors and the LED loop have been completed indicating that the Power Tube is properly seated and the four modules connected and ready to start. The series circuit of the sensors and LED's constitute the fail-safe start mechanism control. Their signal turns on the systems control 280 as well. Once that system is on, it indicates visually that the air start 82 can be implemented and automatically turns the power supply 270 on. The power to the processor 200 then comes on and the 125 sensors digital signals through the systems control 280 are activated monitoring the RPM, temperature pressure, flows, levels, and seismic activity of the Power Tube. As the power comes into the system, the RPM of the turbine 40, the pressure and temperature of the steam in the boiler 30 have reached the nominal working relationship, an automatic signal cuts off the air start 82. And the valves from the boiler to the turbine open and the cycle of control through the processor 200 and the buss bar 100 is in operation for a preferable 5 years.

The Power Tube 20 may also include a monitoring system. All the sensors and control units provide information that may be received by a complex computer system or by a standard lap top computer for analysis. The same information may be compressed into a short "burst signal" and sent through a satellite uplink through a satellite network service to a central control 300 wherein on a periodic basis the monitors pertaining to individual Power Tubes are automatically updated and all emergency signals can be received and acted upon by supervising engineers and then by return compressed signals in burst mode that trim, tweak or correct internal functions, and rectify the alarm condition. The seismic signals from the Power Tubes are subscribed to by universities and government organization and private industry that need access to such information. These signals are also part of the burst mode transmission, however, upon reaching 4.5 on the Richter scale, these signals from the six axis seismic sensors become in "real time" constant signals until such the as they fall below the 4.5 level once again. The signals from all the units in down-hole locations world wide as processed through the central control center, may also determine the accumulated total real time usage of electricity and therefore easily providing a means to gage the income stream of the total units installed.

Figure 12:
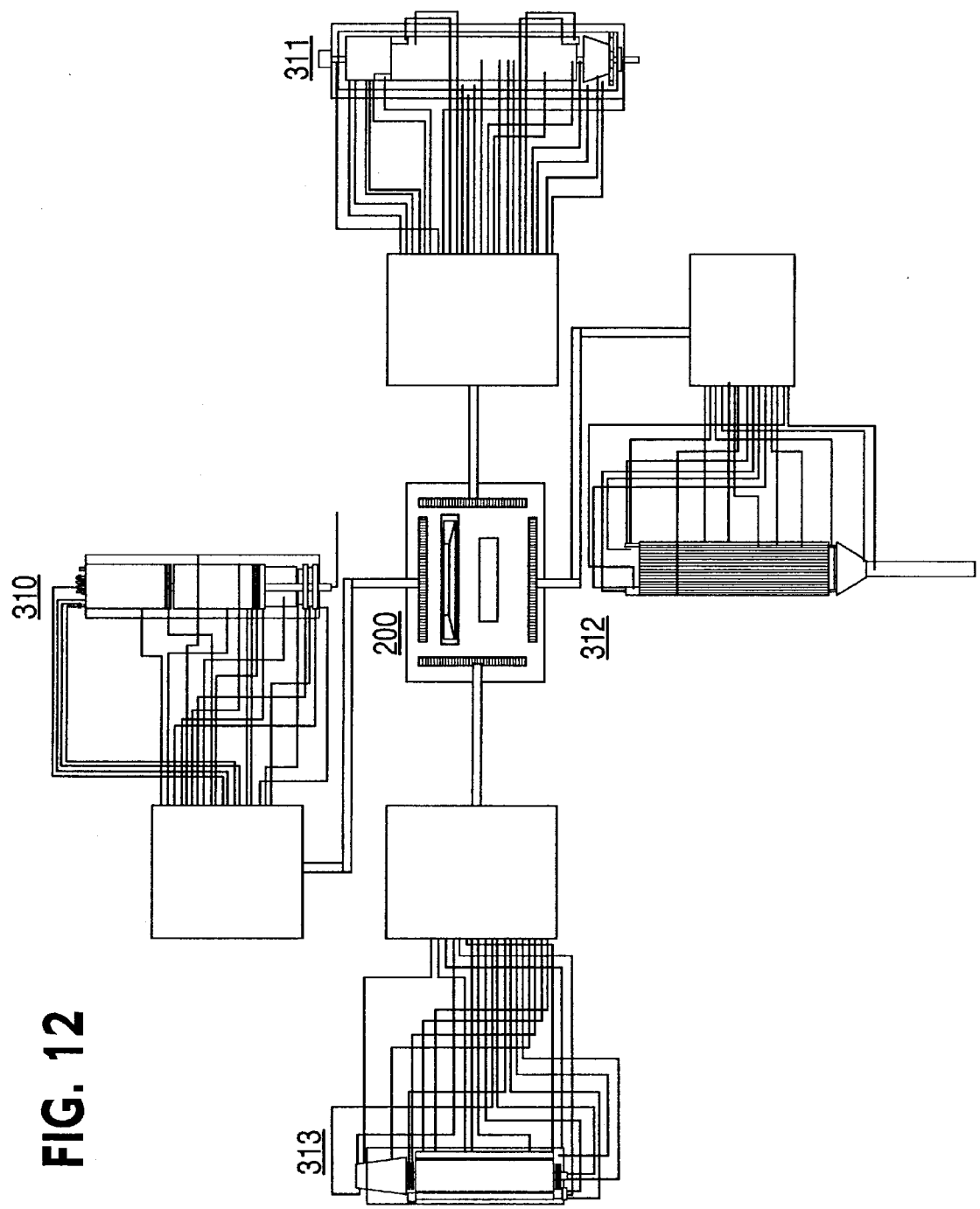
FIG. 12 shows the array of sensor signals in accordance with the present invention.

FIG. 12 shows the PLC control unit or the programmed logic controller 310. The PLC unit may be separated into 4 logic systems run by a fifth logic control circuit that ties all the other sensor signals together with the systems controller 280 and in turn may feed the signals to the up-link station. The diagram of the PLC can be seen in FIG. 12. It is preferably divided into the following: Boiler Array 311, Condenser Array 312, Turbine sensor array 313 and the Generator Array 314. They all feed into the systems processor 200.

Figure 13:
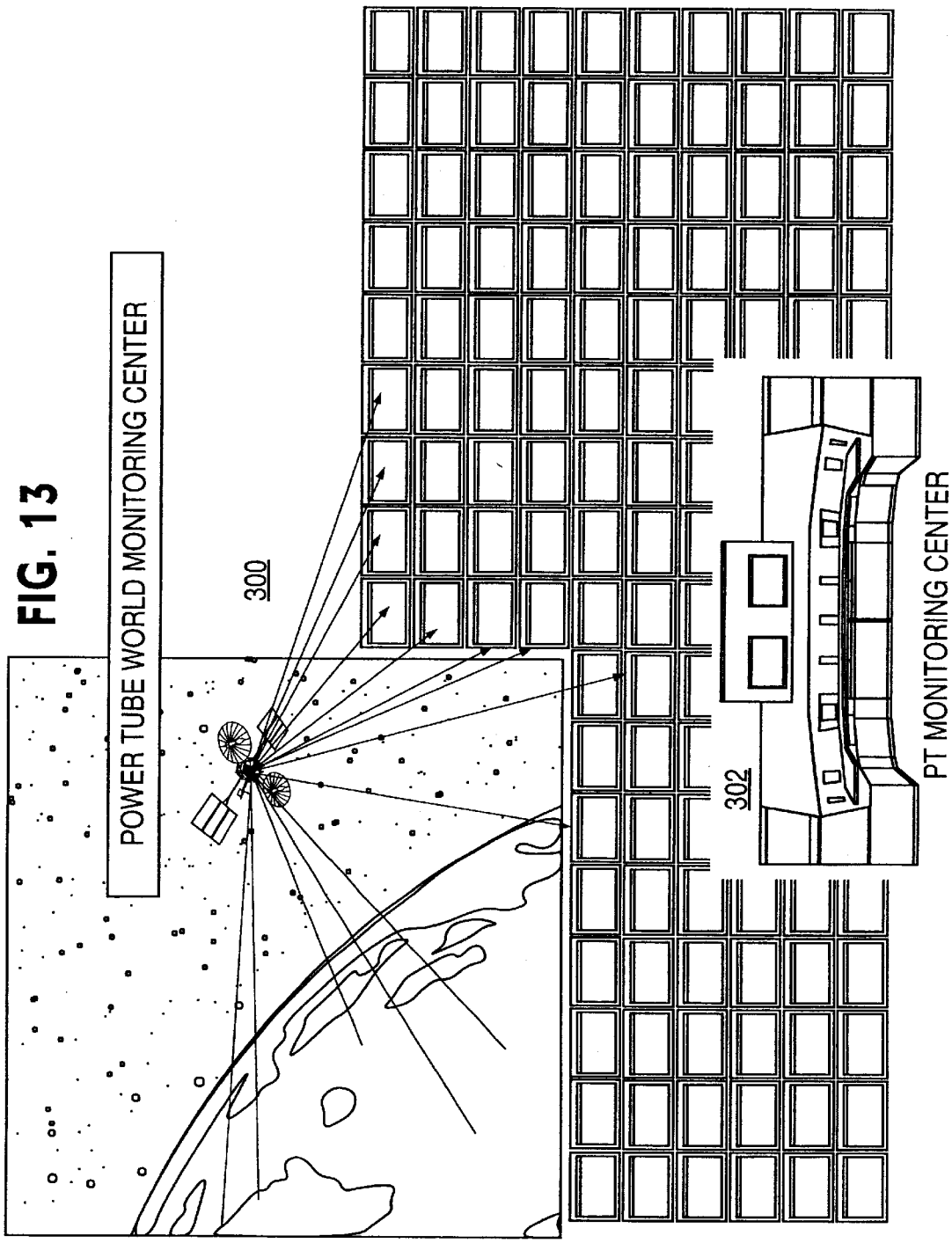
FIG. 13 shows the central control station application and the engineering control console in accordance with the present invention.

FIG. 13 shows one layout of the world monitoring center 300. As shown, the signals received by the satellite are sent to the world monitoring center 300 at this point the signals that pertain to a given Power Tube 20 update the screen on the monitor for that particular power tube every 10 minutes. The signal is compressed and sent in "burst" mode from the ground uplink at the Power Tube site, through the satellite system to the world monitoring center 300 and that burst which may be 10 seconds per Power Tube 20 unit updates the screen designated to go with that particular Power Tube 20. When an alarm signal 301 is triggered on any of the monitors, the operator may bring that signal down to the console 302 and study the alarm before taking action as to the response. From the console, the operator can again send out a correcting signal to the Power Tube over the same network the signal was received, again, in compressed, burst mode. The console of a world monitoring center, preferably may be manned by 5 technicians that preferably supervise 20 Power Tubes 20 each.

Figure 14:
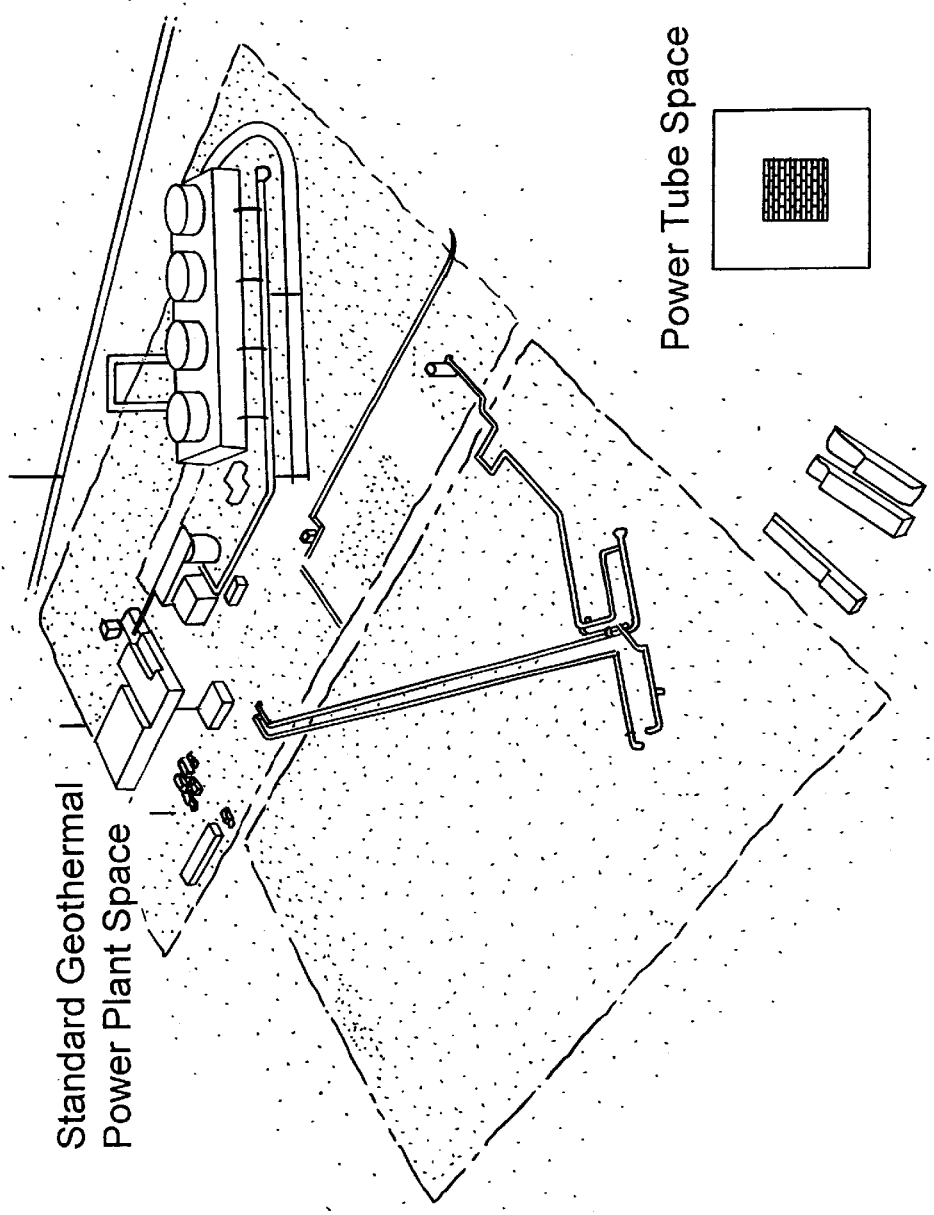
FIG. 14 shows differences between prior art installations using geothermal energy with regard to size of surface and land mass usage to produce the equivalent amount of energy in accordance with the present invention.

FIG. 14 shows the preferable difference in size of land mass occupied by a prior art 10 MW geothermal Power Plant 400 and the space a lower Tube 20 occupies 401. Aside of the space occupied by the prior art system 400, the amount of surface eyesore may be easily observed. The only building in the Power Tube Space 401 may be a 20 Ft×20 Ft×12 Ft high building that is built to slide over rails imbedded in the ground. When a change of Power Tube 20 is made at the end of its life cycle, a plurality of cables may be disconnected from the interred Power tube, then the building holding the electronic control and uplink systems is rolled to one side as the spent Power tube is removed and the new one put into place. At this time the building is rolled back on its tracks over the Power Tube cavity and the plurality of cables re-connected.

A brief discussion of the installation of Power Tube will now be described. The installation takes place in stages. Prior to the arrival of the installation team, a perforation team preferably sub contractors will have been trained by Power Tube company in the preparation of a down-hole drill site, specifically for Power Tube 20. The down hole preparation includes the protective casings required so that the installation team has only to place the hardware in the prepared receptacle. Power tube is designed and may be transported to site in containers, by sea, or land or specifically designed to fit in C130 military type transports. The installation team may be comprised of 3 persons, one HUMMVEE type vehicle and a folded 220 foot flat trailer that when unfolded becomes a 40 Ft trailer. At the end of the trailer is a 30 Ft A frame scaffold. When the containers, if by sea or land arrive for installation, they are opened and the contents transferred to the flat bed trailers. The contents comprises all that is required for the installation including the four Power Tube 20 modules. If by air, the components are shipped only in frame crates and off loaded by the aircraft servicing system including winches and overhead rolling power crane on to the deployed and waiting flat beds. The flat beds are then pulled by the HUMMVEE and together with the three installers arrive at the site for installation.

The installation takes place in stages at the surface collar level of the shafts pre-installed casing. The team erects the "A" frame and winch device. If the installation is a thermal riser 24, then the first set of riser assembly tubes is lowered into the prepared down-hole area. The last length of the heat riser is held at the collar level and the boiler module 30 is attached, then the boiler and riser tubes are lowered to the collar level, the turbine module 40 hoisted over the boiler then lowered and attached, it then is also lowered to collar level. Then the condenser 50, is hoisted over the turbine module and attached and in turn the assembly is once again lowered to collar level. Finally the generator 44*a* in the case of installations less than 5 MW, or both 44*a* and 44*b* for installations of 10 MW may be hoisted up over the condenser turbine and then lowered on to it and fastened. All modules fitting neatly in their vertical rail guides activating the "Fail safe" circuit. The building is pulled over the installation and the cables are quickly connected to the computer, up-link , distribution transformer, and 5 ton air conditioner. After the security lock 290 and power supply 270 indicate on, and the readouts reflect that the systems controller 280 has made contact with all internal sensors and motors, the air start 82 is applied. When the turbine 40 RPM, the boiler 30 pressure, temperature and all other conditions reach nominal as may be determined by the system controller 280, then the air start is automatically shut down, Power Tube 20 is now on its own for preferably 5 years.

FIG. 15 shows alternative vapor mist thioether lubricating system 500 is an optional installation of the preferred embodiment of this invention. The segmented misting unit 501 injects into the circulating ethers, a friction reducing organophosphate molecules that impinge on hot metal surfaces forming lubricating films that reduce the friction and therefore coll the surfaces in environments of 1000 Deg. F. The vapor is circulated around a lubricating circuit by a circulation turbine 502 with a push pull impeller system. The input manifold distributes the ether carrier to all the friction surfaces and the return manifold 504 attached to the extractor 505 takes away the mist now alleviated of some of the organophosphate material. The mist travels back through the condensation line where it drops any water molecules that may have accumulated in the circuit. Also any foreign matter that may have been accumulated drops into the sump. Then the recirculating continues through the flow control valve 508 samples the returning thioether for organophosphate material loss, and notifies the segmented proportional misting unit 501 to bring the circulating material back to acceptable thioether/organophosphate ratios. The material required to be stored is no more than 10 gallons for the 5 year service life of the Power Tube 20 systems. The advantage over the prescribed lubricant described earlier in this embodiment is that the system reservoirs are smaller and, therefore, much lighter, and the temperatures to which this type of lubricant can be subject are almost three times that of the synthetic materials. In case of sudden prolonged increases in temperature of the geothermal earth, the vapor mist lubricating system may be a much better protective way to lubricate the system bearings.

FIG. 16 shows the Power Tube 2000. Whereas the Power Tube 20 is a unit that uses a transmission clutch mechanisms to drive the generators in the generator module44A & 44B, the Power Tube 2000, is designed with a tuned turbine 2001 and a matched Generator grouping 2044A & 2044B that because of design and speed, require no speed reducers, gear box, or clutch mechanism. Power Tube 2000 may used a cyclical rotational coupling 2002. This device allows the Generator 2044A to engage with generator 2044B after generator 2044A has made 150 revolutions. The output power speed of the coupled generators 2044A & 2044B is the same RPM as that of the turbine 2001, namely 8,000 RPM for this matching speed allows the elimination of clutches and gear boxes, speed reducers and speed reducer couplings. And additional advantage is the weight loss of the Power Tube 2000 over Power Tube 20, namely 2,005 Lbs. Furthermore, in Power Tube 2000, the need for lubricants has been eliminated. The lubricant requirements may be replaced by electromagnetic bearings. These may be found in the Generators 2044A & 2044B, in the center drive shaft 2002, in the impeller expeller, and in the turbine 2001. Furthermore, the elimination of the need for lubricants continues in the pumps and rotational equipment were lubricants would normally be necessary. As a result, the bearing system produces less drag and more efficiency as well as a considerable drop in temperature at points that used to be lubricated bearing surfaces. The efficiency gain between the Power Tube 20 and the Power Tube 2000 may be as high as 25% due to the elimination of clutches, speed reducers, couplers, oil pumps, special oil bearing conduits seals and lubricant reservoirs, additionally, the lubricating material and the cooling systems normally required.

Start up for Power Tube 2000 may require an additional step because of the electromagnetic bearings. Startup may include a standby air and power supply. Initially, after the internal circuit advises that all modules are in position, the startup power supply will feed the power to the multiple electromagnetic bearing system. At this point, all the thrust bearings, one at the base of the turbine 2001 the other at the drive shaft in the turbine exhaust housing 2003 and two others, one at the base of generator 2004A and 2004B will lift by 0.50 mm all objects to be rotated. All other electromagnetic bearings deemed centering electromagnetic bearings, will hold all rotational devices in a centered position. When the systems control advises that all electromagnetic bearings are holding the rotational hardware in nominal condition, the air start will begin to turn the turbine 2001 and the sequence of Power Tube 20 for start up will continue. When the generators reach their nominal optimum generating speed, electronic locking systems will disconnect the standby Power Supply from Power Tube 2000 and from that point on the electromagnetic bearings will be maintained by the output current of Power tube 2000.

Parts such as pumps and valves and the expeller/impeller 2052 may be designed to work with electromagnetic bearings. The lack of friction on the electromagnetic bearing surfaces will also be part of the enhancement of the efficiency of Power Tube 2000. Eliminated will be the costs of maintenance and replacement of worn bearings, the limited liability and service life, the difficulties encountered in heat surges with normal bearings, transmission of vibrations, require difficult and costly operations to balance the shaft. Limited allowable peripheral speeds thus making it impossible to reach the speeds required the matched RPM's the Power Tube 2000, Turbine 2001 and generators 2044A 7 2044B that may eventually go as high as 80,000 RPM. This one factor allows for the continual reduction in generator size. This also reduces damping, making it difficult to reach critical speeds. Inability to withstands ambient temperature conditions, especially those where gaskets and seals are required. The rotating speed of a radial magnetic bearing is limited only by the resistance to centrifugal force of the magnetic sheets of the rotor. Using standard laminations it is possible to attain speeds of 200 m/s (40,000 sfm) whereas hydraulic bearings are limited to 50 through 80 m/s (10,000 through 16,000 sfm), and rolling contact bearings 40 to 60 m/s (8,000 through 12,000 sfm). On axial bearings, a circumferential velocity of 350 m/s 70,000 sfm may be possible with standard equipment.

While the invention and some optional operating systems have been described with reference to specific embodiments, the description of the specific embodiments is illustrative only and is not to be construed as limiting the scope of the invention. Various other modifications and changes may occur to those skilled in the art without departing from the spirit and the scope of the invention.

What is claimed is:

1. A system for supplying an electric power by harnessing thermal energy below a surface of Earth, the system comprising:
    a boiler module;
    a turbine module;
    a condenser module; and
    a generator module,
wherein each of said boiler module, said turbine module, said condenser module and said generator module are provided below the surface of Earth to supply said electric power based on said thermal energy, said boiler module, said turbine module, said condenser module and said generator module coupled together under said surface of Earth as a unitary assembly.

2. The system of claim 1, wherein said boiler module harmonically matches said condenser module.

3. The system of claim 1, wherein said system comprises a closed system in which a media changes between a liquid state and a gaseous state.

4. The system of claim 3, wherein said media comprises water.

5. The system of claim 3, wherein said media comprises pentane/butane fluids.

6. The system of claim 1, further comprising a processor that monitors said boiler module, said turbine module, said condenser module, and said generator module, said processor being provided within said system and below said surface of Earth when in operation.

7. The system of claim 1, further comprising an air start turbine unit for bringing said turbine module to a predetermined speed and for disconnecting after the turbine module reaches said predetermined speed.

8. The system of claim 1, further comprising a heat riser system that extends from said boiler module in a direction away from said turbine module.

9. The system of claim 8, wherein said heat riser system comprises a thermal jacket and a thermal riser cone, wherein said jacket comprises a plurality of tubes immersed in a solution that becomes liquid at operational temperatures.

10. The system of claim 9, wherein said solution comprises a sodium solution.

11. The system of claim 1, further comprising a security lock mechanism that indicates when said boiler module, said turbine module, said condenser module and said generator module have been interconnected.

12. A system for supplying power by using a thermal energy below a surface of Earth, said system comprising a modular system provided below the surface of Earth and that harnesses said thermal energy by using a closed media system to generate an electric power, wherein said system utilizes a media that changes from a liquid to a vapor and back to a liquid, wherein said modular system includes a boiler module, a turbine module, a condenser module, and a generator module all provided below the surface of Earth in a unitary assembly to supply said electric power based on said thermal energy.

13. The system of claim 12, further comprising a heat riser system that extends from said boiler module in a direction away from said turbine module.

14. The system of claim 13, wherein said heat riser system comprises a thermal jacket and a thermal riser cone, wherein said jacket comprises a plurality of tubes immersed in a sodium solution that becomes liquid at operational temperatures.

15. The system of claim 12, wherein said boiler module harmonically matches said condenser module.

16. The system of claim 12, wherein said media comprises water.

17. The system of claim 12, wherein said media comprises pentane/butane fluids.

18. A method for producing an electric power comprising:
    providing a boiler module, a turbine module, a condenser module and a generator module in a unitary assembly below a surface of Earth; and
    using thermal energy below the surface of Earth to generate said electric energy by utilizing said boiler module, said turbine module, said condenser module and said generator module.

19. The method of claim 18, wherein said thermal energy is obtained by using a heat riser system that extends from said boiler module in a direction away from said turbine module.

20. A system for supplying an electric power by harnessing thermal energy below a surface of Earth, the system comprising:

a boiler module;

a turbine module;

a condenser module;

a generator module; and a processor that monitors said boiler module, said turbine module, said condenser module, and said generator module, said processor being provided within said system and below said surface of Earth when in operation, wherein each of said boiler module, said turbine module, said condenser module and said generator module are provided below the surface of Earth to supply said electric power based on said thermal energy.

21. A system for supplying an electric power by harnessing thermal energy below a surface of Earth, the system comprising:

a boiler module, a turbine module;

a condenser module;

a generator module; and an air start turbine unit for bringing said turbine module to a predetermined speed and for disconnecting after the turbine module reaches said predetermined speed, wherein each of said boiler module, said turbine module, said condenser module and said generator module are provided below the surface of Earth to supply said electric power based on said thermal energy.

22. A system for supplying an electric power by harnessing thermal energy below a surface of Earth, the system comprising:

a boiler module;

a turbine module;

a condenser module;

a generator module; and a security lock mechanism that indicates when said boiler module, said turbine module, said condenser module and said generator module have been interconnected, wherein each of said boiler module, said turbine module, said condenser module and said generator module are provided below the surface of Earth to supply said electric power based on said thermal energy.

* * * * *